US012720367B2

(12) United States Patent
Ratnam et al.

(10) Patent No.: US 12,720,367 B2
(45) Date of Patent: Aug. 25, 2026

(54) MULTI-LINK TRAFFIC INDICATION FOR BUFFERED TRAFFIC

(71) Applicant: Samsung Electronics Co., Ltd., Suwon-si (KR)

(72) Inventors: Vishnu Vardhan Ratnam, Plano, TX (US); Rubayet Shafin, Allen, TX (US); Boon Loong Ng, Plano, TX (US); Peshal Nayak, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 18/340,775

(22) Filed: Jun. 23, 2023

(65) Prior Publication Data

US 2024/0007904 A1 Jan. 4, 2024

Related U.S. Application Data

(60) Provisional application No. 63/439,476, filed on Jan. 17, 2023, provisional application No. 63/402,369, filed on Aug. 30, 2022, provisional application No. 63/401,397, filed on Aug. 26, 2022, provisional application No. 63/397,200, filed on Aug. 11, 2022, provisional application No. 63/390,127, filed on Jul.

(Continued)

(51) Int. Cl.

*H04W 28/08* (2023.01)
*H04W 72/1273* (2023.01)

(52) U.S. Cl.

CPC ... *H04W 28/0992* (2020.05); *H04W 28/0958* (2020.05); *H04W 72/1273* (2013.01)

(58) Field of Classification Search

CPC ......... H04W 28/0992; H04W 28/0958; H04W 72/1273; H04W 28/086; H04W 28/14; H04W 76/15

See application file for complete search history.

(56) References Cited

U.S. PATENT DOCUMENTS

2021/0259033 A1 8/2021 Kim et al.
2023/0147636 A1* 5/2023 Kim .................. H04W 52/0229 370/318

(Continued)

FOREIGN PATENT DOCUMENTS

WO 2021/003181 A1 1/2021
WO 2021/183045 A1 9/2021

(Continued)

OTHER PUBLICATIONS

IEEE P802.11be-D3.2 "Part 11: Wireless LAN Medium Access Control (MAC) and Physical Layer (PHY) Specifications—Amendment 8: Enhancements for extremely high throughput (EHT)" May 2023, 1055 pgs.

(Continued)

*Primary Examiner* — Jung H Park

(57) ABSTRACT

A wireless communication network includes an access point (AP) multi-link device (MLD) and a non-AP MLD. An AP of the AP MLD indicates to a STA of a non-AP MLD, which is involved in active frame exchanges, whether there is pending buffered traffic for the non-AP MLD on another link, whether the AP MLD intends to recommend the non-AP MLD to use another link to fetch buffered traffic, and/or whether there is a critical update to the BSS on another link.

18 Claims, 27 Drawing Sheets

Related U.S. Application Data

18, 2022, provisional application No. 63/357,996, filed on Jul. 1, 2022.

(56) References Cited

U.S. PATENT DOCUMENTS

2024/0049045 A1* 2/2024 Kim .................. H04W 28/0278
2024/0114573 A1* 4/2024 Ko ........................ H04W 76/15

FOREIGN PATENT DOCUMENTS

WO 2021/251901 A1 12/2021
WO 2022/125421 A1 6/2022

OTHER PUBLICATIONS

IEEE Std 802.Nov. 2020 "Part 11: Wireless LAN Medium Access Control (MAC) and Physical Layer (PHY) Specifications" IEEE Standard for Information Technology—Telecommunications and Information Exchange between Systems Local and Metropolitan Area Networks—Specific Requirements. Dec. 3, 2020. 4379 pgs.
International Search Report & Written Opinion for PCT/KR2023/009089 by Korean Intellectual Property Office dated Oct. 5, 2023.
IEEE 802.11-21/0019r10 "Proposed Draft Text for MLO TID-to-link Mapping", Wireless LANs. Apr. 2021.
Extended European Search Report for EP 23831918.0 by European Patent Office dated Feb. 28, 2025.

* cited by examiner

Figure 2A:
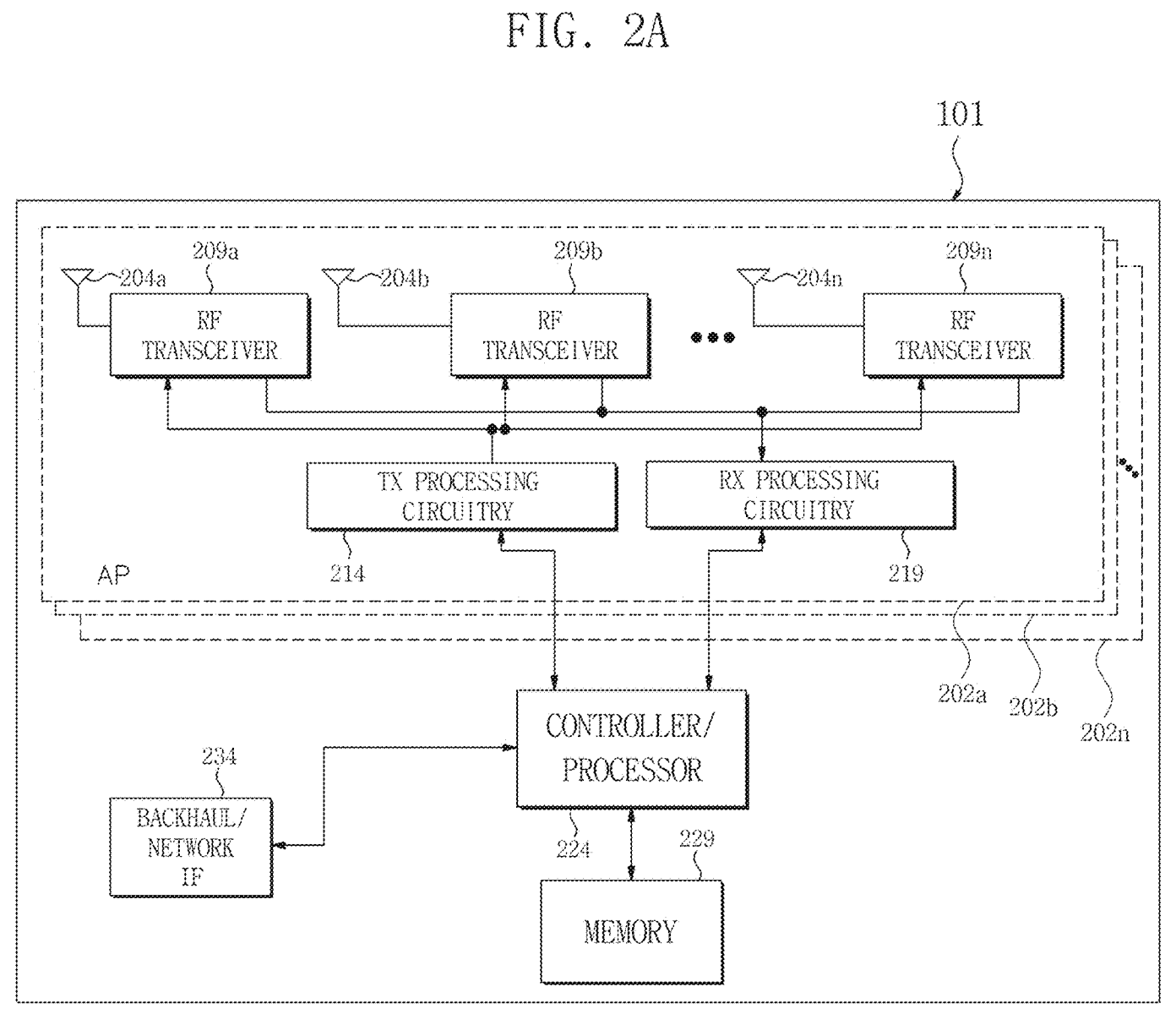

FIG. 2A 101
202a
202b
202n
AP
RF TRANSCEIVER 209a
RF TRANSCEIVER 209b
RF TRANSCEIVER 209n
204a
204b
204n
RX PROCESSING CIRCUITRY 219
TX PROCESSING CIRCUITRY 214
CONTROLLER/ PROCESSOR 224
MEMORY 229
BACKHAUL/ NETWORK IF 234

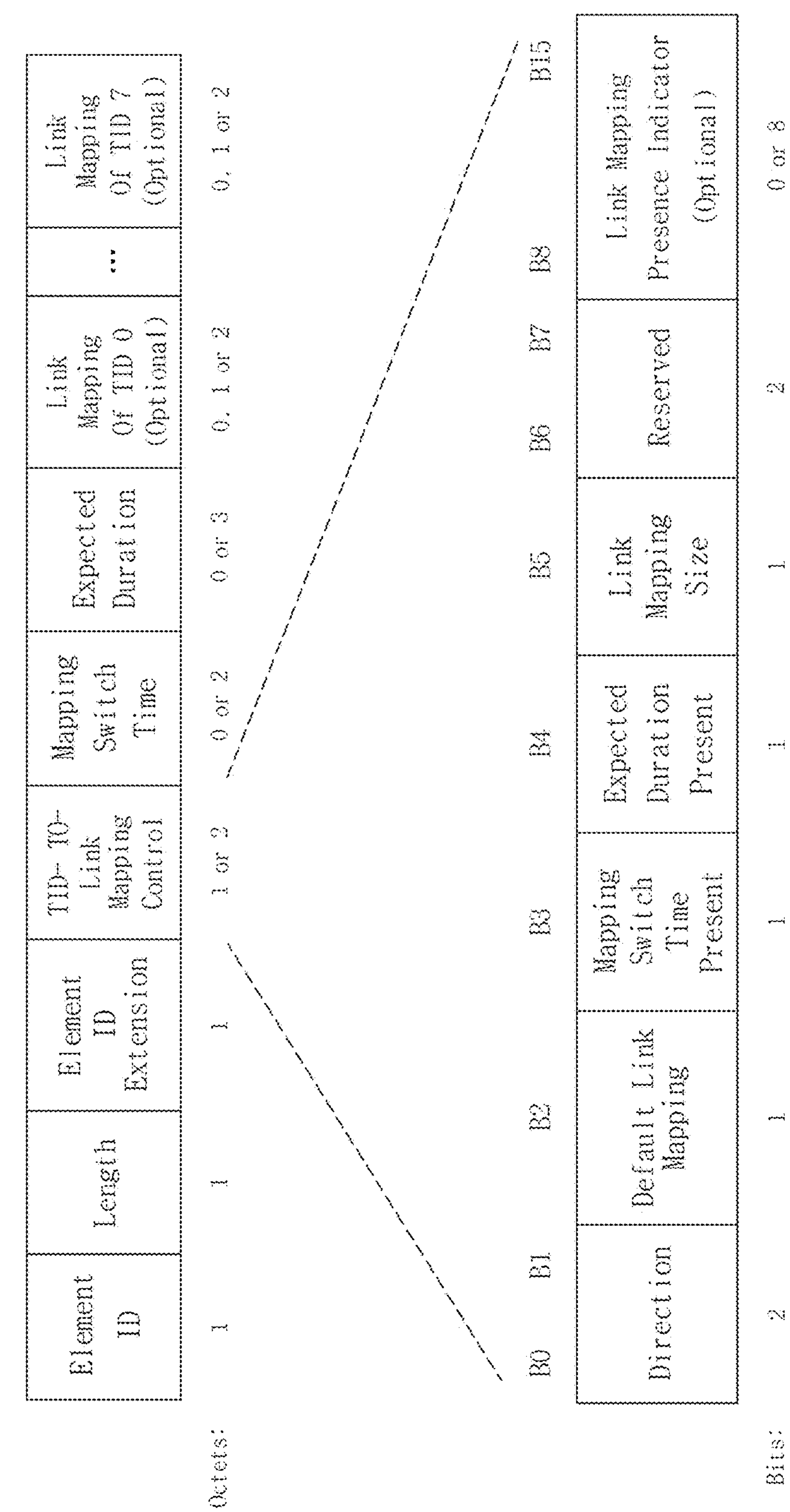
FIG. 4
400
Element ID
Length
Element ID Extension
TID- TO- Link Mapping Control
Mapping Switch Time
Expected Duration
Link Mapping Of TID 0 (Optional)
...
Link Mapping Of TID 7 (Optional)
Octets:
1
1
1
1 or 2
0 or 2
0 or 3
0, 1 or 2
0, 1 or 2
B0
B1
B2
B3
B4
B5
B6
B7
B8
B15
Direction
Default Link Mapping
Mapping Switch Time Present
Expected Duration Present
Link Mapping Size
Reserved
Link Mapping Presence Indicator (Optional)
Bits:
2
1
1
1
1
2
0 or 8

MLD Capabilities and Operations subfield format

FIG. 9B

Subfields of the MLD Capabilities and Operations field

| Subfield | Definition | Encoding |
|---|---|---|
| MLTI Support | A non-AP MLD indicates support for receiving a frame with the MLTI Control subfield | For an AP MLD this subfield is reserved.<br>For a non-AP MLD:<br>Is set to 1 if the non-AP MLD supports reception of a frame with the MLTI Control subfield and is set to 0 otherwise. |

FIG. 10
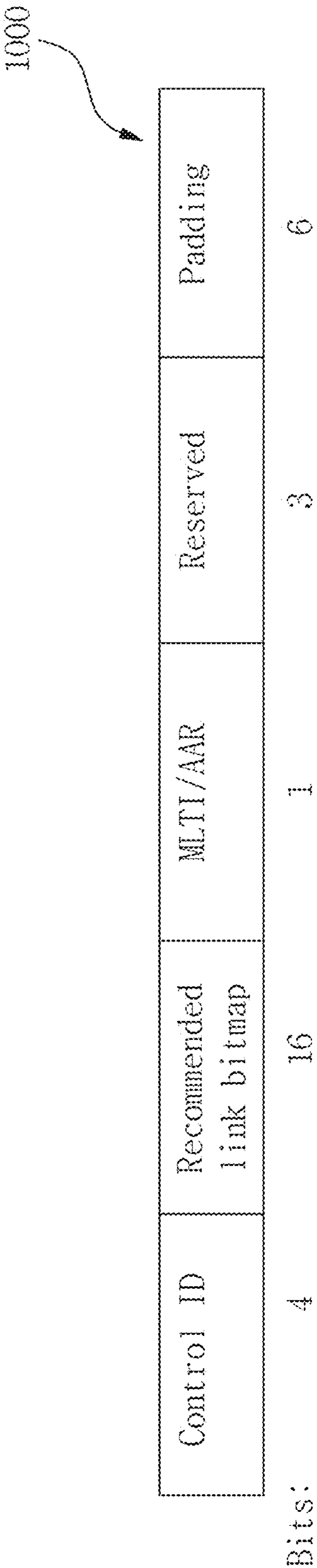
1000
Control ID
Recommended link bitmap
MLTI/AAR
Reserved
Padding
Bits:
4
16
1
3
6

FIG. 11B

| Subtype value | Meaning | Content of the Control Information Subfield |
|---|---|---|
| 0 | AP Assistance Request (AAR) | Indicates the link IDs of the STAs that are requesting assistance from the corresponding APs for medium synchronization recovery. |
| 1 | Multi-Link Traffic Indication (MLTI)or Wake-up requset (WR) | Indicates the link IDs of the STAs affiliated with the recipient non-AP MLD that are requested to transition to awake state by the transmitting AP MLD. |
| 2~7 | Reserved | |

Figure 16:
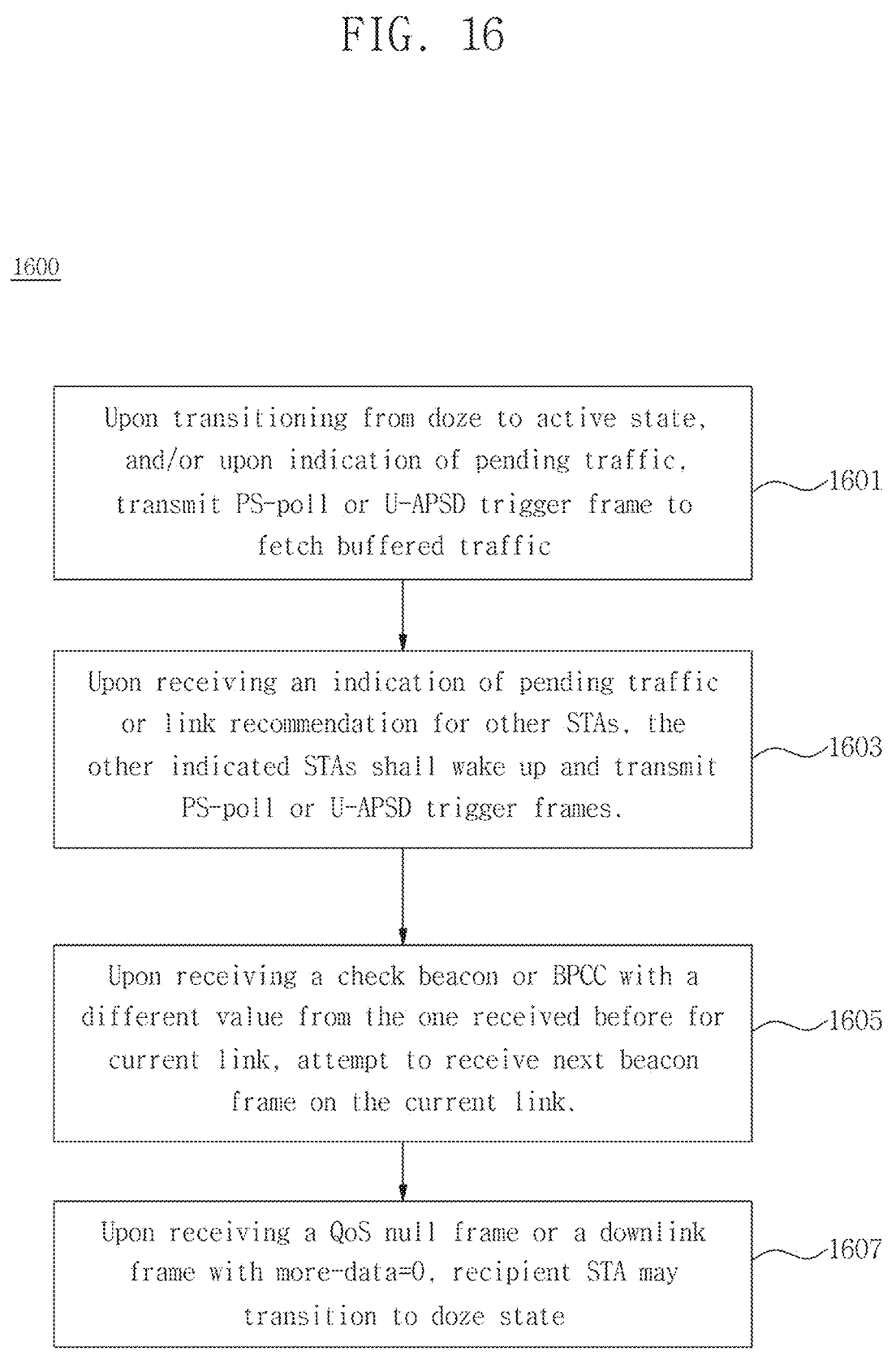

Upon transitioning from doze to active state, and/or upon indication of pending traffic, transmit PS-poll or U-APSD trigger frame to fetch buffered traffic — 1601

Upon receiving an indication of pending traffic or link recommendation for other STAs, the other indicated STAs shall wake up and transmit PS-poll or U-APSD trigger frames. — 1603

Upon receiving a check beacon or BPCC with a different value from the one received before for current link, attempt to receive next beacon frame on the current link. — 1605

Upon receiving a QoS null frame or a downlink frame with more-data=0, recipient STA may transition to doze state — 1607

MULTI-LINK TRAFFIC INDICATION FOR BUFFERED TRAFFIC

CROSS-REFERENCE TO RELATED APPLICATIONS

This application claims the benefit of priority from U.S. Provisional Application No. 63/357,996, entitled "ENHANCEMENT FOR MULTI-LINK TRAFFIC INDICATION FOR A NONAP MLD", filed Jul. 1, 2022; U.S. Provisional Application No. 63/390,127, entitled "MULTI-LINK TRAFFIC INDICATION VIA INDIVIDUALLY ADDRESSED FRAMES," filed Jul. 18, 2022; U.S. Provisional Application No. 63/397,200, entitled "MULTI-LINK TRAFFIC INDICATION VIA INDIVIDUALLY ADDRESSED FRAMES," filed Aug. 11, 2022; U.S. Provisional Application No. 63/401,397, entitled "MULTI-LINK TRAFFIC INDICATION VIA INDIVIDUALLY ADDRESSED FRAMES," filed Aug. 26, 2022; U.S. Provisional Application No. 63/402,369, entitled "MULTI-LINK TRAFFIC INDICATION VIA INDIVIDUALLY ADDRESSED FRAMES," filed Aug. 30, 2022; and U.S. Provisional Application No. 63/439,476, entitled "MULTI-LINK TRAFFIC INDICATION VIA INDIVIDUALLY ADDRESSED FRAMES," filed Jan. 17, 2023, all of which are incorporated herein by reference in their entirety.

TECHNICAL FIELD

This disclosure relates generally to wireless communication systems, and more particularly to, for example, but not limited to, multi-link traffic indication for a multi-link device in wireless communication systems.

BACKGROUND

Wireless local area network (WLAN) technology has evolved toward increasing data rates and continues its growth in various markets such as home, enterprise and hotspots over the years since the late 1990s. WLAN allows devices to access the internet in the 2.4 GHz, 5 GHz, 6 GHz or 60 GHz frequency bands. WLANs are based on the Institute of Electrical and Electronic Engineers (IEEE) 802.11 standards. IEEE 802.11 family of standards aims to increase speed and reliability and to extend the operating range of wireless networks.

WLAN devices are increasingly required to support a variety of delay-sensitive applications or real-time applications such as augmented reality (AR), robotics, artificial intelligence (AI), cloud computing, and unmanned vehicles. To implement extremely low latency and extremely high throughput required by such applications, multi-link operation (MLO) has been suggested for the WLAN. The WLAN is formed within a limited area such as a home, school, apartment, or office building by WLAN devices. Each WLAN device may have one or more stations (STAs) such as the access point (AP) STA and the non-access-point (non-AP) STA.

The MLO may enable a non-AP multi-link device (MLD) to set up multiple links with an AP MLD. Each of multiple links may enable channel access and frame exchanges between the non-AP MLD and the AP MLD independently, which may reduce latency and increase throughput.

The description set forth in the background section should not be assumed to be prior art merely because it is set forth in the background section. The background section may describe aspects or embodiments of the present disclosure.

SUMMARY

One embodiment of the present disclosure provides an access point (AP) multi-link device (MLD) associated with a wireless network. The AP MLD comprises a first AP and one or more second APs affiliated with the AP MLD and a processor coupled to the first AP and one or more second APs. The processor is configured to perform individually addressed frame exchanges between a first station (STA) affiliated with a non-AP MLD and the first AP affiliated with the AP MLD via a first link. The first STA and one or more second STAs are affiliated with the non-AP MLD. The processor is configured to transmit, to the first STA affiliated with the non-AP MLD via the first link, a downlink frame including an indication of presence of buffered traffic to the non-AP MLD on one or more second links, or a link recommendation for the one or more second links to retrieve buffered traffic. Each of the one or more second links is set up between a second AP affiliated with the AP MLD and a corresponding second STA affiliated with the non-AP MLD. The processor is configured to receive, from a second STA affiliated with the non-AP MLD via a second link, a frame to request transmission of buffered traffic via the second link. The processor is configured to transmit, to the second STA affiliated with the non-AP MLD via the second link, buffered traffic in response to the frame.

In some embodiments, a traffic identifier (TID) of the buffered traffic is not mapped to the first link and the TID of the buffered traffic is mapped to the one or more second links.

In some embodiments, the one or more second STAs affiliated with the non-AP MLD are in doze state when the downlink frame is transmitted.

In some embodiments, the indication of presence of buffered traffic or the link recommendation for the one or more second links is included in a control field of the downlink frame.

In some embodiments, the control field includes a bitmap to identify the one or more second STAs, and a field to identify a purpose of the bitmap.

In some embodiments, the indication of presence of buffered traffic or the link recommendation for the one or more second links is included in a buffer status report within a control field of the downlink frame.

In some embodiments, the processor is further configured to receive, from the first STA affiliated with the non-AP MLD via the first link, a request to transmit the downlink frame including the buffer status report.

In some embodiments, the downlink frame further includes information about an update on a basic service set (BSS) to which the AP MLD belongs. The information about the update indicates a need for the non-AP MLD to check for the update on at least one link between the AP MLD and the non-AP MLD.

In some embodiments, the downlink frame further includes information indicating absence of buffered traffic to the non-AP MLD on one or more second links or information indicating recommended one or more second STAs to not transition to awake state.

In some embodiments, the indication of presence of buffered traffic or the link recommendation for the one or more second links is included in the downlink frame when the AP MLD receives, from the non-AP MLD, an indication of support for receiving the indication of presence of buffered traffic or the link recommendation.

One embodiment of the present disclosure may provide a non-access point (AP) multi-link device (MLD) associated with a wireless network. The non-AP MLD comprises a first STA and one or more second STAs affiliated with the non-AP MLD and a processor coupled to the first STA and one or more second STAs. The processor is configured to perform individually addressed frame exchanges between a first AP affiliated with an AP MLD and the first STA affiliated with the non-AP MLD via a first link. The first AP and one or more second APs are affiliated with the AP MLD. The processor is configured to receive, from the first AP affiliated with the AP MLD via the first link, a downlink frame including an indication of presence of buffered traffic to the non-AP MLD on one or more second links, or a link recommendation for the one or more second links to retrieve buffered traffic. Each of the one or more second links is set up between a second AP affiliated with the AP MLD and a corresponding second STA affiliated with the non-AP MLD. The processor is configured to transmit, to a second AP affiliated with the AP MLD via a second link, a frame to request transmission of buffered traffic via the second link. The processor is configured to receive, from the second AP affiliated with the AP MLD via the second link, buffered traffic.

In some embodiments, a traffic identifier (TID) of the buffered traffic is not mapped to the first link and the TID of the buffered traffic is mapped to the one or more second links.

In some embodiments, the one or more second STAs affiliated with the non-AP MLD are in doze state when the downlink frame is transmitted, and the processor is further configured to coordinate that the second STA wakes up and transitions from the doze state to awake state or active state in response to receiving the downlink frame.

In some embodiments, the indication of presence of buffered traffic or the link recommendation for the one or more second links is included in a control field of the downlink frame.

In some embodiments, the control field includes a bitmap to identify the one or more second STAs, and a field to identify a purpose of the bitmap.

In some embodiments, the indication of presence of buffered traffic or the link recommendation for the one or more second links is included in a buffer status report within a control field of the downlink frame.

In some embodiments, the processor is further configured to transmit, to the first AP affiliated with the AP MLD via the first link, a request to transmit the downlink frame including the buffer status report.

In some embodiments, the downlink frame further includes information about an update on a basic service set (BSS) to which the AP MLD belongs. The information about the update indicates a need for the non-AP MLD to check for the update on at least on link between the AP MLD and the non-AP MLD.

In some embodiments, the downlink frame further includes information indicating absence of buffered traffic to the non-AP MLD on one or more second links or information indicating recommended one or more second links to not transition to awake state.

In some embodiments, the indication of presence of buffered traffic or the link recommendation for the one or more second links is included in the downlink frame when the non-AP MLD transmits an indication of support for receiving the indication of presence of buffered traffic or the link recommendation.

BRIEF DESCRIPTION OF THE DRAWINGS

FIG. 2A shows an example of an AP in accordance with an embodiment.

FIG. 4 shows an example of a TID-to-Link Mapping element in accordance with an embodiment.

FIGS. 9A and 9B show examples of multi-link device capabilities and operations subfield 900 of a basic multi-link element in accordance with an embodiment.

FIG. 10 shows an example of a MLTI Control subfield in accordance with an embodiment.

FIG. 11B shows an example of a Subtype subfield and a Control Information subfield in the Link Indication A-Control subfield in accordance with an embodiment.

FIG. 16 shows an example of a process for receiving indication of buffered traffic in individually addressed frames by a non-AP MLD in accordance with an embodiment.

Figure 1:
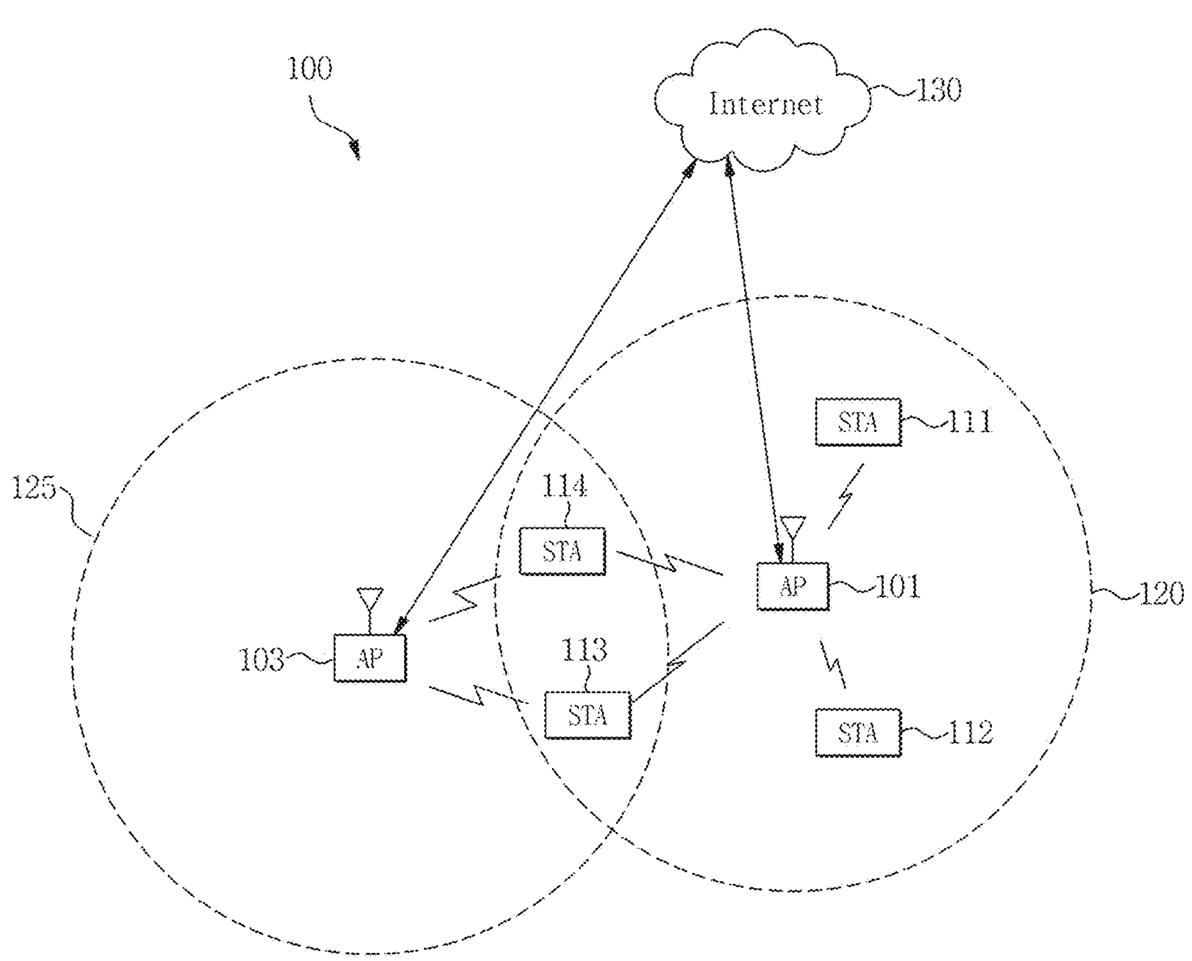
FIG. 1 shows an example of a wireless network in accordance with an embodiment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

The following description is directed to certain implementations for the purpose of describing the innovative aspects of this disclosure. However, a person having ordinary skill in the art will readily recognize that the teachings herein can be applied in a multitude of different ways. The examples in this disclosure are based on WLAN communication according to the Institute of Electrical and Electronics Engineers (IEEE) 802.11 standard, including IEEE 802.11be standard and any future amendments to the IEEE 802.11 standard. However, the described embodiments may be implemented in any device, system or network that is capable of transmitting and receiving radio frequency (RF) signals according to the IEEE 802.11 standard, the Bluetooth standard, Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), 5G NR (New Radio), AMPS, or other known signals that are used to communicate within a wireless, cellular or internet of things (IoT) network, such as a system utilizing 3G, 4G, 5G, 6G, or further implementations thereof, technology.

FIG. 1 shows an example of a wireless network 100 in accordance with an embodiment. The embodiment of the wireless network 100 shown in FIG. 1 is for illustrative purposes only. Other embodiments of the wireless network 100 could be used without departing from the scope of this disclosure.

As shown in FIG. 1, the wireless network 100 may include a plurality of wireless communication devices. Each wireless communication device may include one or more stations (STAs). The STA may be a logical entity that is a singly addressable instance of a medium access control (MAC) layer and a physical (PHY) layer interface to the wireless medium. The STA may be classified into an access point (AP) STA and a non-access point (non-AP) STA. The AP STA may be an entity that provides access to the distribution system service via the wireless medium for associated STAs. The non-AP STA may be a STA that is not contained within an AP-STA. For the sake of simplicity of description, an AP STA may be referred to as an AP and a non-AP STA may be referred to as a STA. In the example of FIG. 1, APs 101 and 103 are wireless communication devices, each of which may include one or more AP STAs. In such embodiments, APs 101 and 103 may be AP multi-link device (MLD). Similarly, STAs 111-114 are wireless communication devices, each of which may include one or more non-AP STAs. In such embodiments, STAs 111-114 may be non-AP MLD.

The APs 101 and 103 communicate with at least one network 130, such as the Internet, a proprietary Internet Protocol (IP) network, or other data network. The AP 101 provides wireless access to the network 130 for a plurality of stations (STAs) 111-114 with a coverage are 120 of the AP 101. The APs 101 and 103 may communicate with each other and with the STAs using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

In FIG. 1, dotted lines show the approximate extents of the coverage area 120 and 125 of APs 101 and 103, which are shown as approximately circular for the purposes of illustration and explanation. It should be clearly understood that coverage areas associated with APs, such as the coverage areas 120 and 125, may have other shapes, including irregular shapes, depending on the configuration of the APs.

As described in more detail below, one or more of the APs may include circuitry and/or programming for management of MU-MIMO and OFDMA channel sounding in WLANs. Although FIG. 1 shows one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101 and 103 could communicate directly with the network 130 and provides STAs with direct wireless broadband access to the network 130. Further, the APs 101 and/or 103 could provide access to other or additional external networks, such as external telephone networks or other types of data networks.

FIG. 2A shows an example of AP 101 in accordance with an embodiment. The embodiment of the AP 101 shown in FIG. 2A is for illustrative purposes, and the AP 103 of FIG. 1 could have the same or similar configuration. However, APs come in a wide range of configurations, and FIG. 2A does not limit the scope of this disclosure to any particular implementation of an AP.

As shown in FIG. 2A, the AP 101 may include multiple antennas 204*a*-204*n*, multiple radio frequency (RF) transceivers 209*a*-209*n*, transmit (TX) processing circuitry 214, and receive (RX) processing circuitry 219. The AP 101 also may include a controller/processor 224, a memory 229, and a backhaul or network interface 234. The RF transceivers 209*a*-209*n* receive, from the antennas 204*a*-204*n*, incoming RF signals, such as signals transmitted by STAs in the network 100. The RF transceivers 209*a*-209*n* down-convert the incoming RF signals to generate intermediate (IF) or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209*a*-209*n* receive the outgoing processed baseband or IF signals from the TX processing circuitry 214 and up-converts the baseband or IF signals to RF signals that are transmitted via the antennas 204*a*-204*n*.

The controller/processor 224 can include one or more processors or other processing devices that control the overall operation of the AP 101. For example, the controller/processor 224 could control the reception of uplink signals and the transmission of downlink signals by the RF transceivers 209*a*-209*n*, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including a combination of DL MU-MIMO and OFDMA in the same transmit opportunity. In some embodiments, the controller/processor 224 may include at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 may include any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for management of channel sounding procedures in WLANs. Although FIG. 2A illustrates one example of AP 101, various changes may be made to FIG. 2A. For example, the AP 101 could include any number of each component shown in FIG. 2A. As a particular example, an AP could include a number of interfaces 234, and the controller/processor 224 could support routing functions to route data between different network addresses. As another example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

As shown in FIG. 2A, in some embodiment, the AP 101 may be an AP MLD that includes multiple APs 202*a*-202*n*. Each AP 202*a*-202*n* is affiliated with the AP MLD 101 and includes multiple antennas 204*a*-204*n*, multiple radio frequency (RF) transceivers 209*a*-209*n*, transmit (TX) processing circuitry 214, and receive (RX) processing circuitry 219. Each APs 202*a*-202*n* may independently communicate with the controller/processor 224 and other components of the AP MLD 101. FIG. 2A shows that each AP 202*a*-202*n* has separate multiple antennas, but each AP 202*a*-202*n* can share multiple antennas 204*a*-204*n* without needing separate multiple antennas. Each AP 202*a*-202*n* may represent a physical (PHY) layer and a lower media access control (MAC) layer.

Figure 2B:
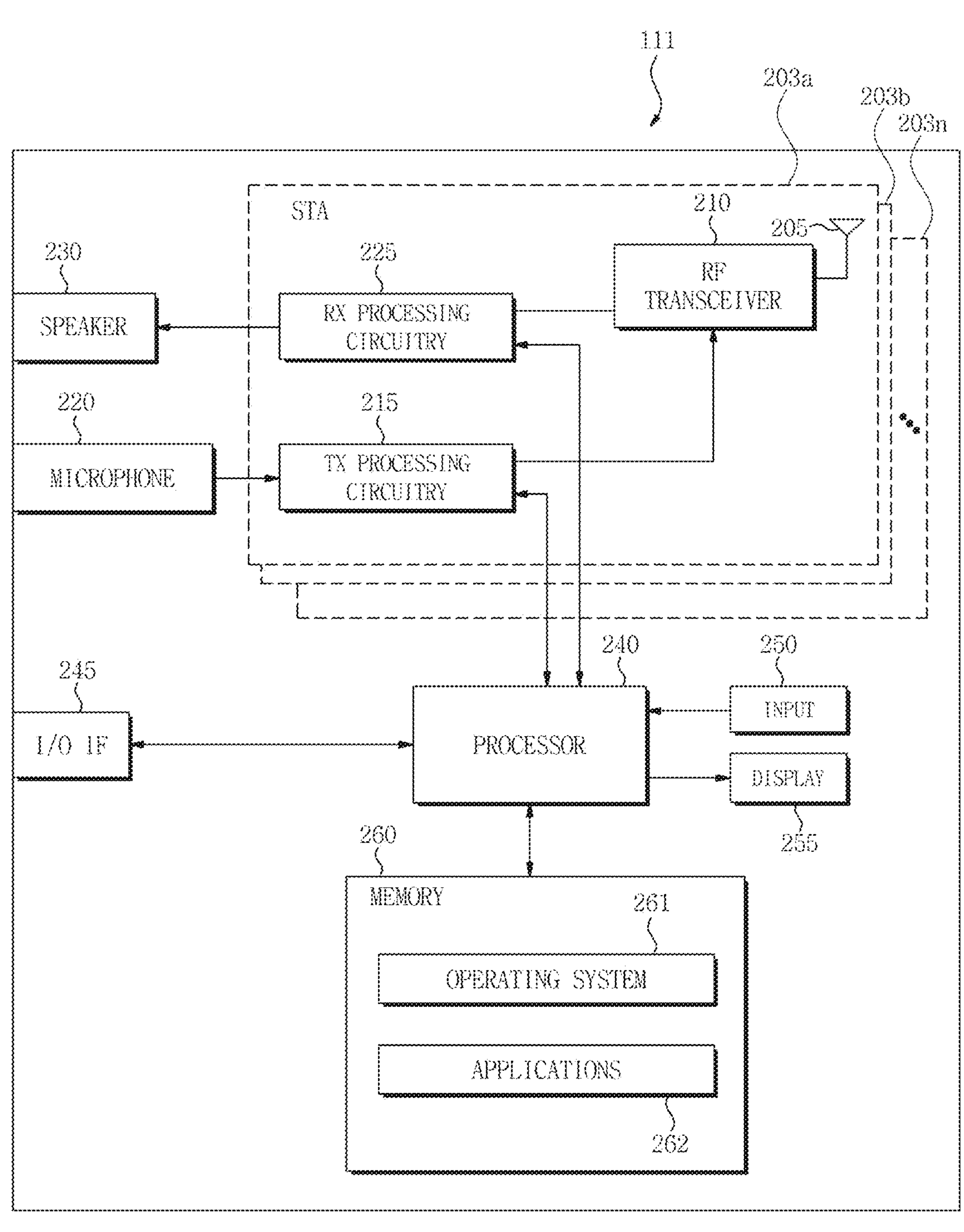
FIG. 2B shows an example of a STA in accordance with an embodiment.

FIG. 2B shows an example of STA 111 in accordance with an embodiment. The embodiment of the STA 111 shown in FIG. 2B is for illustrative purposes, and the STAs 111-114 of FIG. 1 could have the same or similar configuration. However, STAs come in a wide variety of configurations, and FIG. 2B does not limit the scope of this disclosure to any particular implementation of a STA.

As shown in FIG. 2B, the STA 111 may include antenna(s) 205, a RF transceiver 210, TX processing circuitry 215, a microphone 220, and RX processing circuitry 225. The STA 111 also may include a speaker 230, a controller/processor 240, an input/output (I/O) interface (IF) 245, a touchscreen 250, a display 255, and a memory 260. The memory 260 may include an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an IF or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the controller/processor 240 controls the reception of downlink signals and the transmission of uplink signals by the RF transceiver 210, the RX processing circuitry 225, and the TX processing circuitry 215 in accordance with well-known principles. The controller/processor 240 can also include processing circuitry configured to provide management of channel sounding procedures in WLANs. In some embodiments, the controller/processor 240 may include at least one microprocessor or microcontroller.

The controller/processor 240 is also capable of executing other processes and programs resident in the memory 260, such as operations for management of channel sounding procedures in WLANs. The controller/processor 240 can move data into or out of the memory 260 as required by an executing process. In some embodiments, the controller/processor 240 is configured to execute a plurality of applications 262, such as applications for channel sounding, including feedback computation based on a received null data packet announcement (NDPA) and null data packet (NDP) and transmitting the beamforming feedback report in response to a trigger frame (TF). The controller/processor 240 can operate the plurality of applications 262 based on the OS program 261 or in response to a signal received from an AP. The controller/processor 240 is also coupled to the I/O interface 245, which provides STA 111 with the ability to connect to other devices such as laptop computers and handheld computers. The I/O interface 245 is the communication path between these accessories and the main controller/processor 240.

The controller/processor 240 is also coupled to the input 250 (such as touchscreen) and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B shows one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As shown in FIG. 2B, in some embodiment, the STA 111 may be a non-AP MLD that includes multiple STAs 203*a*-203*n*. Each STA 203*a*-203*n* is affiliated with the non-AP MLD 111 and includes an antenna(s) 205, a RF transceiver 210, TX processing circuitry 215, and RX processing circuitry 225. Each STAs 203*a*-203*n* may independently communicate with the controller/processor 240 and other components of the non-AP MLD 111. FIG. 2B shows that each STA 203*a*-203*n* has a separate antenna, but each STA 203*a*-203*n* can share the antenna 205 without needing separate antennas. Each STA 203*a*-203*n* may represent a physical (PHY) layer and a lower media access control (MAC) layer.

Figure 3:
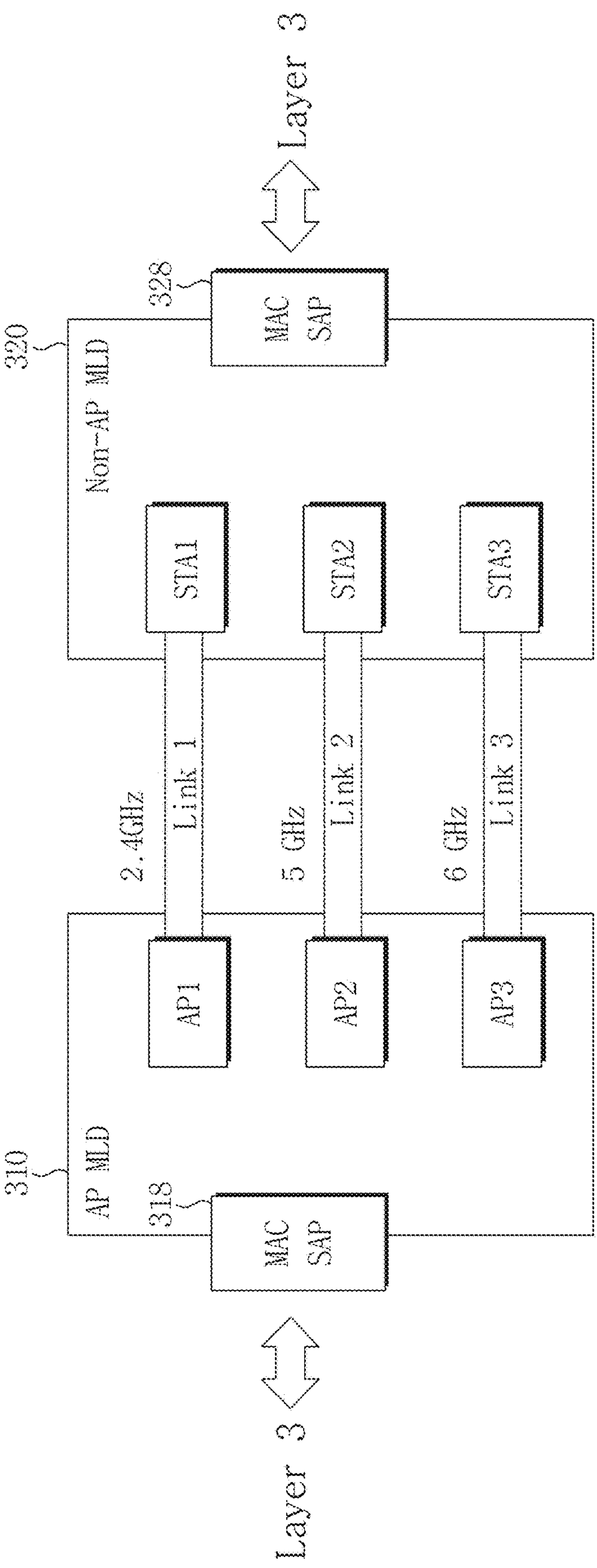
FIG. 3 shows an example of multi-link communication operation in accordance with an embodiment.

FIG. 3 shows an example of multi-link communication operation in accordance with an embodiment. The multi-link communication operation may be usable in IEEE 802.11be standard and any future amendments to IEEE 802.11 standard. In FIG. 3, an AP MLD 310 may be the wireless communication device 101 and 103 in FIG. 1 and a non-AP MLD 220 may be one of the wireless communication devices 111-114 in FIG. 1.

As shown in FIG. 3, the AP MLD 310 may include a plurality of affiliated APs, for example, including AP 1, AP 2 and AP 3. Each affiliated AP may include a PHY interface to wireless medium (Link 1, Link 2, or Link 3). The AP MLD 310 may include a single MAC service access point (SAP) 318 through which the affiliated APs of the AP MLD 310 communicate with a higher layer (Layer 3 or network layer). Each affiliated AP of the AP MLD 310 may have a MAC address (lower MAC address) different from any other affiliated APs of the AP MLD 310. The AP MLD 310 may have a MLD MAC address (upper MAC address) and the affiliated APs share the single MAC SAP 318 to Layer 3. Thus, the affiliated APs share a single IP address, and the Layer 3 recognizes the AP MLD 310 by assigning the single IP address.

The non-AP MLD 320 may include a plurality of affiliated STAs, for example, including STA 1, STA 2 and STA 3. Each affiliated STA may include a PHY interface to the wireless medium (Link 1, Link 2, or Link 3). The non-AP MLD 320 may include a single MAC SAP 328 through which the affiliated STAs of the non-AP MLD 320 communicate with a higher layer (Layer 3 or network layer). Each affiliated STA of the non-AP MLD 320 may have a MAC address (lower MAC address) different from any other affiliated STAs of the non-AP MLD 320. The non-AP MLD 320 may have a MLD MAC address (upper MAC address) and the affiliated STAs share the single MAC SAP 328 to Layer 3. Thus, the affiliated STAs share a single IP address, and the Layer 3 recognizes the non-AP MLD 320 by assigning the single IP address.

The AP MLD 310 and the non-AP MLD 320 may set up multiple links between their affiliate APs and STAs. In this example, the AP 1 and the STA 1 may set up Link 1 which operates in 2.4 GHz band. Similarly, the AP 2 and the STA 2 may set up Link 2 which operates in 5 GHz band, and the AP 3 and the STA 3 may set up Link 3 which operates in 6 GHz band. Each link may enable channel access and frame exchange between the AP MLD 310 and the non-AP MLD 320 independently, which may increase date throughput and reduce latency.

In order to prioritize transmission of different types of traffic, which are identified by a traffic identifier (TID), across the setup links, the non-AP MLD 320 may negotiate a TID-to-link mapping with the AP MLD 310. The TID-to-link mapping allows the AP MLD 310 and the non-AP MLD 320 to determine how frames belonging to TIDs are assigned for transmission on each setup link in the uplink and downlink directions, respectively. When at least one TID associated with a non-AP MLD 320 is mapped to a setup link in either uplink or downlink direction, the link is referred to as an enabled link for the non-AP MLD 320. By default, all TIDs are mapped to all the setup links between the AP MLD 310 and the non-AP MLD 320, and this mapping is referred to as a default TID-to-link mapping. During association, the non-AP MLD 320 can use a negotiation procedure to negotiate a non-default mapping of TIDs to the setup links, by including a TID-to-Link Mapping element in an association request frame or a reassociation request frame. The non-default mapping can be either where all TIDs are mapped to the same subset of setup links, or where not all TIDs are mapped to the same subset of setup links. The AP MLD 310 can also use a broadcast procedure to indicate switching to a non-default mapping for all associated non-AP MLDs. In default mapping mode, all TIDs are mapped to all setup link for downlink and uplink and all setup links are enabled. The non-AP MLD 320 operates under default mapping mode when a TID-to-link mapping negotiation did not occur or was unsuccessful.

FIG. 4 shows an example of a TID-to-Link Mapping element 400 in accordance with an embodiment. This example of FIG. 4 can be applicable to IEEE 802.11be standard and any of future amendments to IEEE 802.11 standard. The TID-to-Link Mapping element 400 may indicate the links on which frames belongings to each TID can be exchanged.

As shown in FIG. 4, the TID-to-Link Mapping element 400 may include an Element ID field, a Length field, an Element ID Extension field, a TID-to-Link Mapping Control field, a Mapping Switch Time field, an Expected Duration field, and optional Link Mapping of TID n fields.

The Element ID field and the Element ID Extension field may include information to identify the TID-to-Link Mapping element 400. The Length field may indicate a length of the TID-to-Link Mapping element 400.

The TID-to-Link Mapping Control field may include a Direction subfield, a Default Link Mapping subfield, a Mapping Switch Time Present subfield, an Expected Duration Present subfield, a Link Mapping Size subfield, a Reserved subfield, and an optional Link Mapping Presence Indicator subfield. The Direction subfield may indicate if the TID-to-Link Mapping element 400 is for downlink frames, uplink frames, or both. For example, the Direction subfield may be set to 0 for downlink frames, 1 for uplink frames, and 2 for frames transmitted both on downlink and uplink. The Default Link Mapping subfield may indicate if the TID-to-Link Mapping element 400 represents default TID-to-link mapping. For example, the subfield may be set to 1 for default mapping and 0 for non-default mapping. The Mapping Switch Time Present subfield may indicate if the Mapping Switch Time field is present in the TID-To-Link Mapping element 400. The Expected Duration Present subfield may indicate if the Expected Duration field is present in the TID-To-Link Mapping element 400. The Link Mapping Size subfield may indicate the length of the Link Mapping of TID n field. The Link Mapping Presence Indicator subfield may indicate whether the Link Mapping of TID n fields are present in the TID-To-Link Mapping element 400.

The Mapping Switch Time field is present when the TID-to-Link Mapping element 400 is transmitted by an AP affiliated with an AP MLD in a beacon or probe response frame and the indicated TID-to-link mapping is not yet established.

The Expected Duration field may indicate the duration for which the proposed TID-to-link mapping is expected to be effective when the Mapping Switch Time field is present, and the remaining duration for which the proposed TID-to-link mapping is expected to be effective when the Mapping Switch Time field is not present.

The Link Mapping of TID n field (where n=0, 1, . . . , 7, for example) may indicate the links on which frames belonging to the TID n are allowed to be sent. The Link Mapping of TID n fields may carry a bitmap of the links to which the TID n is mapped. When the Default Link Mapping subfield of the TID-To-Link Mapping Control field represents default TID-to-link mapping, the Link Mapping of TID n fields may not be present. For example, when the Direction subfield is set to 0, the Default Link Mapping subfield is set to 0, and the Link Mapping of TID 0 field is configured to 10000 . . . 0, this configuration indicates that downlink data corresponding TID 0 is transmitted on Link 1.

The TID-to-Link Mapping element 400 may be included in various management frames, for example, a beacon frame, an association request/response frame, a re-association request/response frame, or a probe response frame.

In order to allow non-AP MLD to save power, there may be several power management solutions. For example, a STA of the non-AP MLD can be in doze state for an extended period of time, during which it is not expected to be able to transmit or receive frames. During this time, the corresponding AP of the AP MLD may buffer buffer-able units (BUs) (buffered BUs or buffered traffic) that are addressed to the STA of the non-AP MLD. In order to indicate to all associated non-AP MLDs about the presence of pending BUs via a broadcast or multi-cast signaling, each AP affiliated with the AP MLD periodically includes a traffic information map (TIM) element within the beacon frame it transmits and, each AP affiliated with the AP MLD may optionally transmit a separate periodic broadcast TIM frame. In multi-link operation, the AP of the AP MLD may include a Multi-Link Traffic Indication element in the beacon frame to indicate the link on which the buffered BUs (or buffered traffic) can be retrieved.

Figure 5A:
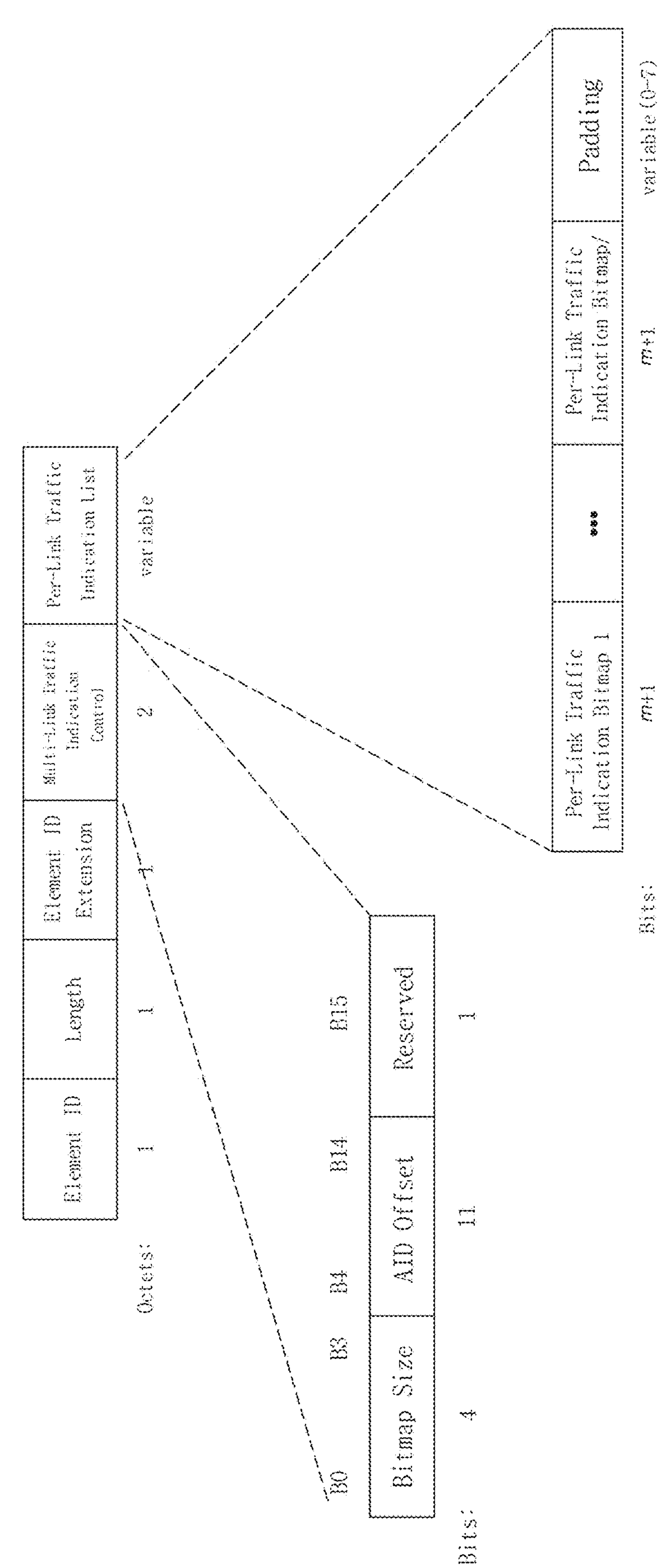
FIG. 5A shows an example of a Multi-Link Traffic Indication element in accordance with an embodiment.

FIG. 5A shows an example of a Multi-Link Traffic Indication element in accordance with an embodiment. This example may be applicable to IEEE 802.11be standard and any of future amendments to IEEE 802.11 standard.

As shown in FIG. 5A, the Multi-Link Traffic Indication element 500 may include an Element ID field, a Length field, an Element ID Extension field, a Multi-Link Traffic Indication Control field, and a Per-Link Traffic indication List field.

The Element ID field and the Element ID extension field may include information to identify the Multi-Link Traffic indication element 500. The Length field may indicate a length of the Multi-Link Traffic indication element 500.

The Multi-Link Traffic Indication Control field may include a Bitmap Size subfield, an association identifier (AID) Offset subfield, and Reserve subfield. The Bitmap Size subfield may indicate the size of each Per-Link Traffic Indication Bitmap subfield in the Per-Link Traffic Indication List field. The AID offset subfield may indicate a bit numbered k of a traffic indication virtual bitmap in the TIM. The traffic indication virtual bitmap indicates presence of pending traffic for a particular STA or non-AP MLD at the AP MLD.

The Per-Link Traffic Indication List field may include a plurality of Per-Link Traffic Indication Bitmap subfields and a Padding subfield. The Per-Link Traffic Indication Bitmap subfields may indicate per-link traffic indication for the non-AP MLD that has negotiated the TID-to-link mapping with the AP MLD, where not all TIDs are mapped to all enabled links. In an embodiment, the Per-Link Traffic Indication Bitmap subfield may indicate link recommendation to retrieve buffered traffic for a non-AP MLD that has negotiated a TID-to-link mapping with an AP MLD and all TIDs are mapped to all the enabled links. In an embodiment, the Per-Link Traffic Indication Bitmap subfield indicates link recommendation to retrieve buffered traffic for a non-AP MLD in default mapping mode. The Padding subfield may include padding bits to make The Per-Link Traffic Indication List field a multiple of 8 bits.

Figure 5B:
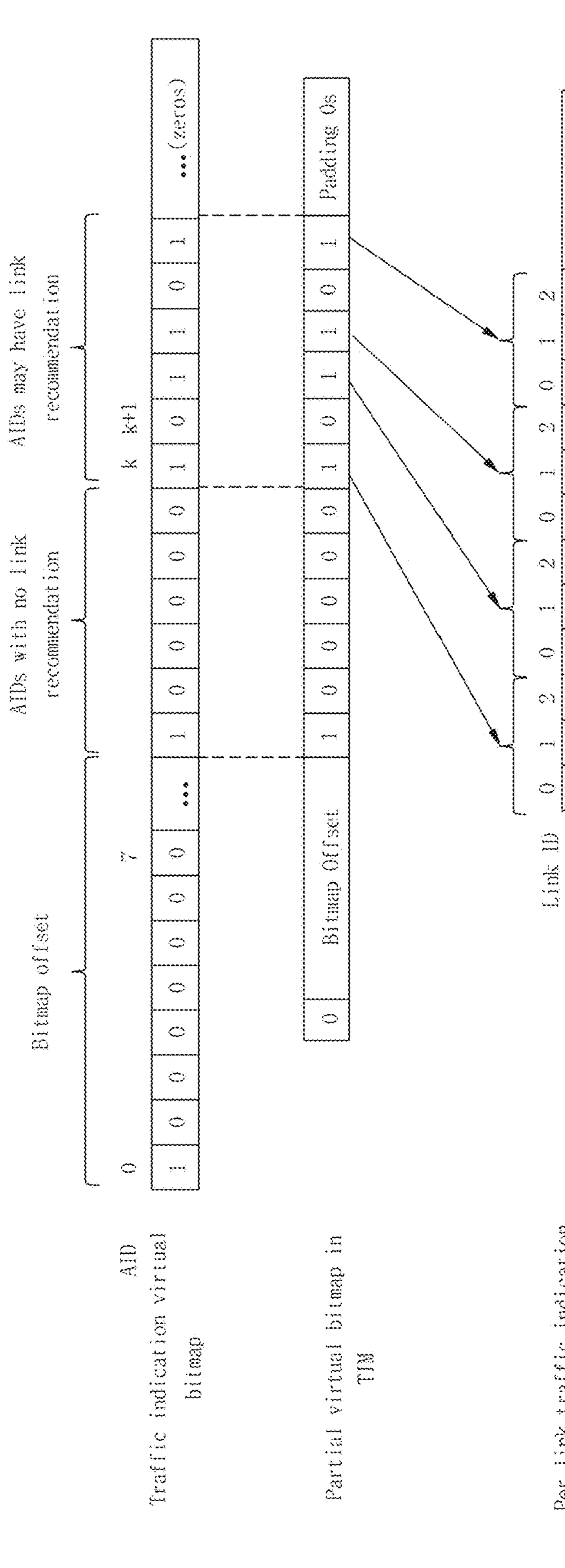
FIG. 5B shows an example of construction of the Multi-Link Traffic Indication element in accordance with an embodiment.

FIG. 5B shows an example of construction of the Multi-Link Traffic Indication element in accordance with an embodiment.

In FIG. 5B, a traffic indication virtual bitmap and a partial virtual bitmap subfield in TIM element illustrated in the top and middle portions show how to indicate the AID of associated non-AP MLDs and STAs. An AP affiliated with an AP MLD may indicate pending buffered traffic for non-AP MLDs and STAs associated with the AP MLD using the partial virtual bitmap of the TIM element. The partial virtual bitmap subfield in TIM element may include part of the traffic indication virtual bitmap illustrated in the top portion. An AP affiliated with an AP MLD may include the Multi-Link Traffic Indication element 500, which is partially illustrated on the bottom in FIG. 5B, in a Beacon frame it transmits.

As explained, the Multi-Link Traffic Indication element 500 may include Per-Link Traffic Indication Bitmap subfields which correspond to the AIDs of the non-AP MLDs or STAs, starting from the bit number k of the traffic indication virtual bitmap which is indicated in the AID offset subfield in the Multi-Link Traffic Indication element 500. The order of the Per-Link Traffic Indication Bitmap subfields may follow the order of the bits that are set to 1 in the partial virtual bitmap subfield in the TIM element. If a non-AP MLD has a non-default TID-to-link mapping with an AP MLD, the bit position i of the Per-Link Traffic Indication Bitmap subfield for link ID i may be set to 1 if the AP MLD has buffered BUs or medium access control (MAC) management protocol data units (MMPDUs) with TIDs mapped to that link for that non-AP MLD, otherwise the bit shall be set to 0. If a non-AP MLD is in the default mapping mode, the bit position i of the Per-Link Traffic Indication Bitmap subfield for link ID i may be set to 1 if the AP MLD has buffered BUs or MMPDUs and the non-AP MLD should use the link i to retrieve the buffered BUs or MMPDUs. Therefore, the AP MLD may provide link recommendations to the non-AP MLD to use one or more enabled links to retrieve buffered traffic.

In the example of FIG. 5B, the first, the third, the fourth, and the sixth AIDs in the partial virtual bitmap subfield in the TIM are set to 1, starting from the bit number k of the traffic indication virtual bitmap which is indicated in the AID offset subfield. The Per-Link Traffic Indication Bitmap subfields correspond to the first, the third, the fourth, and the sixth AIDs in the partial virtual bitmap subfield in ascending order. The first Per-Link Traffic Indication Bitmap subfield may indicate in AID k that the AP MLD has pending buffered traffic in the link 0. Therefore, a non-AP MLD with AID k can retrieve the pending buffered traffic using the link 0. The remaining Per-Link Traffic Indication Bitmap subfields indicate the recommended links in a similar way.

In some implementations, an AP of an AP MLD is not capable of indicating to a STA of a non-AP MLD, with which the AP of the AP MLD is involved in an active frame exchange, that there is buffered traffic addressed to the non-AP MLD, for TIDs that is not mapped to the current link. Such an indication may reduce latency of fetching buffered traffic and checking for critical updates in a multi-link setup. This indication may be useful in the following implementations, which will be explained below.

Figure 6A:
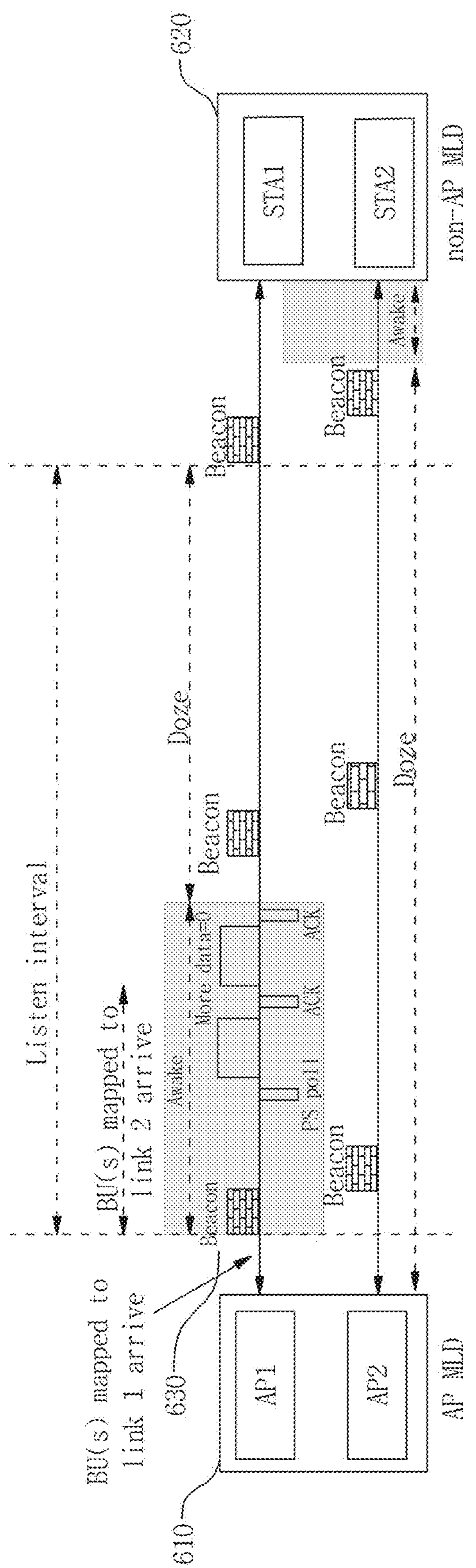
FIGS. 6A to 6E show other examples of multi-link operation in accordance with an embodiment.

FIG. 6A shows an example of multi-link operation in accordance with an embodiment. In FIG. 6A, an AP MLD 610 may include two affiliated APs (e.g., AP 1 and AP 2) and a non-AP MLD 620 may include two affiliated STAs (e.g., STA 1 and STA 2). The AP1 and the STA 1 set up Link 1 and the AP 2 and the STA 2 set up Link 2. Each link may enable channel access and frame exchanges between the AP MLD 610 and the non-AP MLD 620 independently. In this example, it is assumed that the non-AP MLD 620 is both in non-default TID-to-link mapping mode and power save mode on Link 1 and Link 2.

While operating in power save mode, the STA 1 may wake up to receive a beacon frame (630) transmitted by AP 1 and may determine that the AP MLD 610 has buffered traffic or bufferable units (BUs) for the non-AP MLD 620. The BU may be a medium access control (MAC) service data unit (MSDU), aggregate MAC service data unit (MSDU) [quality-of-service (QoS) stations (STAs) only], or bufferable MAC management protocol data unit (MMPDU). The BU may be buffered to operate the power save mode. In this disclosure, the terms 'buffered traffic' and 'buffered BUs' may be used interchangeably and have the same meaning.

When the STA 1 determines that the AP MLD 610 has buffered BUs, the STA 1 may indicate to the AP 1 that the STA 1 has transitioned to awake state from doze state and initiate frame exchanges with AP 1 to retrieve buffered BUs by transmitting a PS (Power Save)-Poll frame or a U-APSD (Unscheduled Automatic Power Save Delivery) trigger frame via Link 1. In response to the PS-Poll frame or the U-APSD trigger frame, the AP 1 may deliver buffered BUs mapped to the STA 1 if the buffered BUs are available and not discarded for implementation dependent reasons. Otherwise, the AP 1 may transmit a QoS Null frame. Upon receipt of the QoS Null frame, the STA 1 may transition to doze state. When the AP 1 is involved in the frame exchanges with STA 1 in power save mode, the AP 1 may use a More Data subfield (set to 1) of a control field of a downlink frame to indicate to the STA 1 that more individually addressed BUs are buffered for the non-AP MLD 620. After the AP 1 transmits all buffered BUs that are mapped to the STA 1, the AP 1 may send a downlink frame with a More data subfield set to 0 to the STA 1. Then, the STA 1 may go back to the doze state for the remaining listen interval. However, as shown in FIG. 6A, after the beacon frame (630) transmission and before the frame exchanges, the AP 1 may have new BUs of TIDs that are not mapped to the STA 1. Current IEEE 802.11 standards does not provide a mechanism to indicate the presence of such new BUs in an individually addressed frame to the STA 1 of the non-AP MLD 620. Thus, the STA 1 may not be aware of the status of buffered BUs on another links or any critical updates on other links, via exchange of individually addressed frames with the AP 1. Those indications may be only carried in the beacon frames or TIM frames. Accordingly, the new BUs are only delivered after the non-AP 620 decodes the next TIM element and a Multi-Link Traffic Indication element, which may cause a high latency in recovering the newly arrived BUs.

Figure 6B:
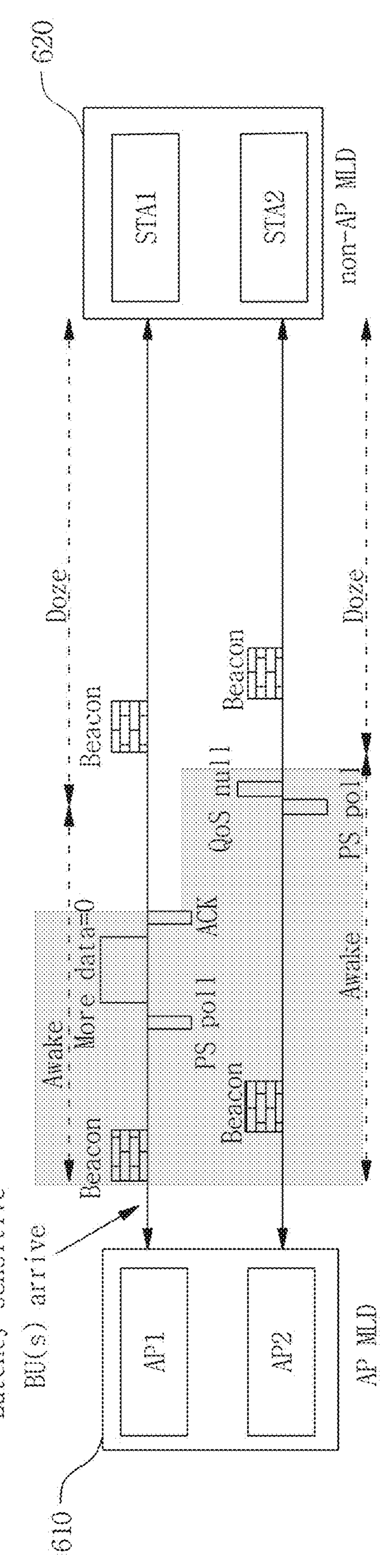

FIG. 6B shows another example of multi-link operation in accordance with an embodiment. Similar to FIG. 6A, it is assumed that the non-AP MLD 620 is both in non-default TID-to-link mapping mode and power save mode on Link 1 and Link 2. When latency sensitive traffic is mapped to both Link 1 and Link 2, the AP MLD 610 may indicate both Link 1 and Link 2 as recommended links in the Per-link Traffic Indication bitmap subfield of the Multi-link Traffic Information element for faster channel access and delivery. As shown in FIG. 6B, the STA 1 may wake up to receive a beacon frame transmitted by AP 1 and determine that the AP MLD 610 has buffered BUs for the non-AP MLD 620. Then, the STA 1 may indicate to the AP 1 that the STA 1 has transitioned to awake state from doze state and initiate frame exchanges with the AP 1 to retrieve buffered BUs by transmitting a PS-Poll frame or a U-APSD trigger frame a via Link 1. After the AP 1 transmits all buffered BUs, the AP 1 may send the More data subfield set 0 to the STA 1. However, even after the STA 1 receives the More data subfield set to 0, the STA 1 may not know if the STA 2 operating on Link 2 needs to transmit a PS-Poll frame or a U-APSD trigger frame to retrieve buffered BUs via Link 2. Therefore, without an indication of whether there are buffered BUs for other links, the STA 2 of the non-AP MLD 620 may unnecessarily stay awake and send another PS-Poll frame or a U-APSD trigger frame via another link (i.e., Link 2) as shown in FIG. 6B.

Figure 6C:
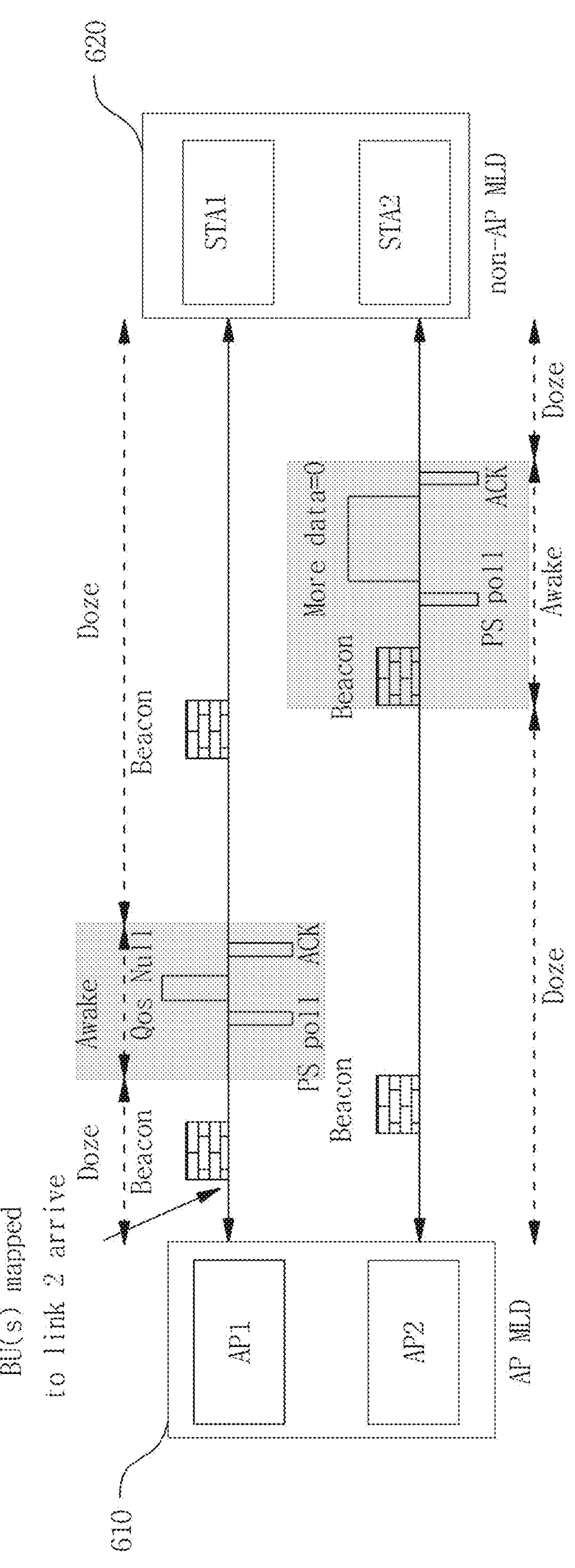

FIG. 6C shows another example of multi-link operation in accordance with an embodiment. Similar to FIG. 6A, it is assumed that the non-AP MLD 620 is both in non-default TID-to-link mapping mode and power save mode on Link 1 and Link 2. In FIG. 6C, the STA 1 affiliated with the non-AP MLD 620 may wake up for some reasons (e.g., P2P communication), and then transmit a PS-Poll frame to the AP 1 of the AP MLD 610 to fetch buffered BUs without decoding a TIM element or a Multi-Link Traffic Indication element. In this example, the STA 1 may only fetch BUs mapped to the STA 1 via Link 1 and may not be aware of BUs mapped to Link 2. Accordingly, the STA 2 of the non-AP MLD 620 may have to wait to receive a Multi-Link Traffic Indication element that recommends the Link 2 to fetch buffered BU.

Figure 6D:
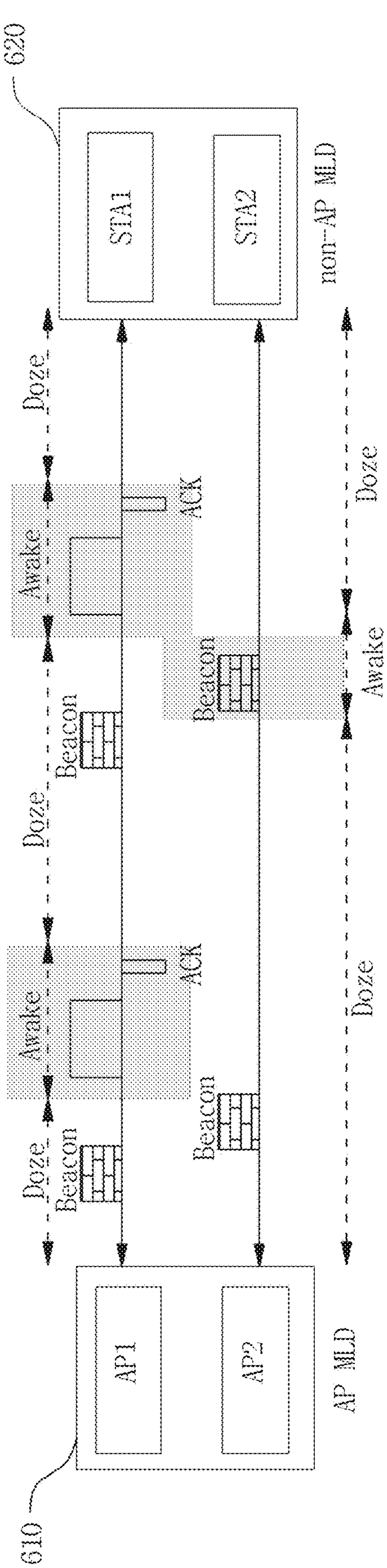

FIG. 6D shows another example of multi-link operation in accordance with an embodiment. Similar to FIG. 6A, it is assumed that the non-AP MLD 620 is both in non-default TID-to-link mapping mode and power save mode on Link 1 and Link 2. In FIG. 6D, it is also assumed that TIDs 1:2 are mapped to Link 1 and all TIDs are mapped to Link 2. Additionally, the STA 1 is assumed to have a target wake time (TWT) negotiation on Link 1. As a result, the STA 1 of the non-AP MLD 620 may periodically wake up in TWT service period (SP) and retrieve BUs mapped to the STA 1. However, the STA 1 may not be aware of buffered BUs mapped to Link 2. Therefore, the STA 2 of the non-AP MLD 620 may have to wait to receive the Multi-Link Traffic Indication element that indicates presence of buffered BUs for the STA 2.

Figure 6E:
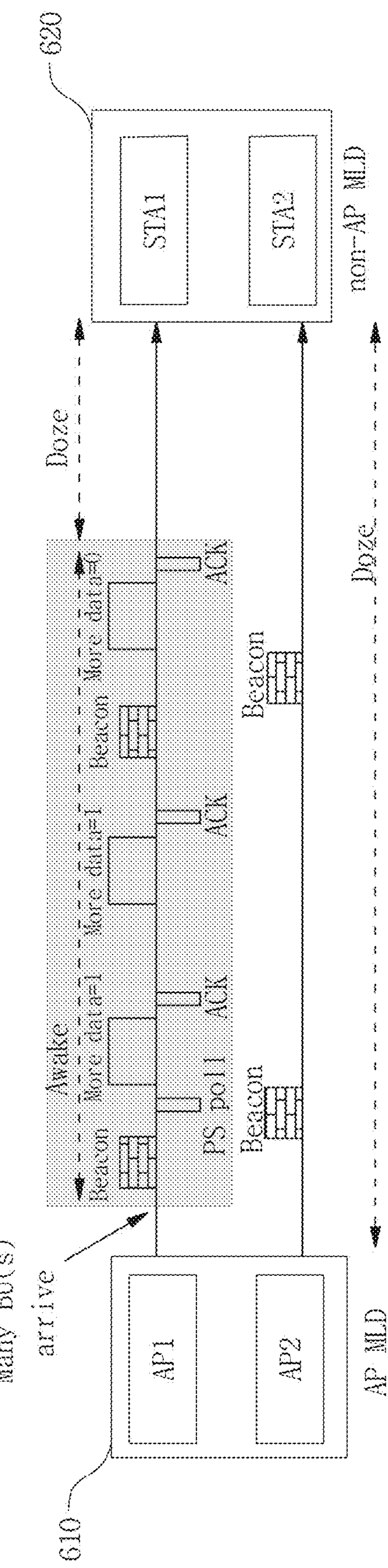

FIG. 6E shows another example of multi-link operation in accordance with an embodiment. Similar to FIG. 6A, it is assumed that the non-AP MLD 620 is both in non-default TID-to-link mapping mode and power save mode on Link 1 and Link 2. In FIG. 6E, the STA 1 may wake up to receive a TIM element in a beacon frame indicating presence of buffered BUs and initiate frame exchanges by transmitting a PS-Poll frame to retrieve buffered BUs. However, in a case that the load on Link 1 is much more than on Link 2 or the pending buffered BUs for the non-AP MLD 620 is significantly high, the AP MLD 610 may need to recommend that the non-AP MLD 620 transition the STA 2 from doze state to awake state and retrieve at least part of the pending buffered BUs. However, current IEEE 802.11 standards do not provide such an indication from the AP MLD 610 to the non-AP MLD 620 during the frame exchange sequence initiated by the PS-Poll frame on Link 1.

In many examples, including those explained in FIGS. 6A-6E, it would be beneficial if the AP MLD could indicate, within the frame exchange sequence initiated by a STA affiliated with a non-AP MLD, whether the AP MLD has buffered traffic which is recommended to be retrieved via another link by other STAs of affiliated with the non-AP MLD.

This disclosure details embodiments that an AP of an AP MLD indicates to a STA of a non-AP MLD which is involved in active frame exchanges in a link i) whether there is pending buffered traffic for the non-AP MLD on another link, ii) whether the AP MLD intends to recommend the non-AP MLD to use another link to fetch buffered traffic, and/or iii) whether there is a critical update to the basic service set (BSS) of the non-AP MLD on another link.

In an embodiment, an additional bit may be added in a frame control field of a downlink PPDU (physical layer (PHY) protocol data unit). The additional bit may be referred to as a "Check TIM" bit, for example. An AP of an AP MLD may utilize the Check TIM bit in the frame control field of a downlink PPDU to indicate to a STA of a non-AP MLD operating on a link in power save mode, that the AP MLD has pending buffered BUs for the non-AP MLD and TIDs of these buffered BUs are not mapped to the current link. Upon receipt of the downlink PPDU with the Check TIM bit set to 1, any STA of the non-AP MLD may attempt to receive a TIM element and/or a Multi-Link Traffic Indication element to check and retrieve the pending buffered BUs. In another embodiment, the indication by the additional bit (e.g., the Check TIM bit) may also be used by the AP MLD to notify the non-AP MLD of the need to decode a next beacon frame on any enabled link for checking any critical updates on one or more enabled links.

In an embodiment, the additional bit (e.g., the Check TIM bit) may be added in a QoS Null frame. An AP of an AP MLD may transmit the QoS Null frame with the Check TIM bit as a response to a PS-Poll frame or a UAPSD trigger frame. This transmission aims to indicate to a STA of a non-AP MLD operating on a link in power save mode, that the AP MLD has pending buffered BUs for the non-AP MLD and TIDs of the buffered BUs are not mapped to the current link. Upon receipt of the QoS Null frame with the Check TIM bit set to 1, any STA of the non-AP MLD may attempt to receive a TIM element and/or a Multi-Link Traffic Indication element to check and retrieve the pending buffered BUs. In another embodiment, the indication by the additional bit (e.g., the Check TIM bit) may also be used by the AP MLD to notify the non-AP MLD of the need to decode a next beacon frame on any enabled link for checking any critical updates on one or more enabled links. In various embodiments, a new information element can be defined as explained below.

Figure 7A:
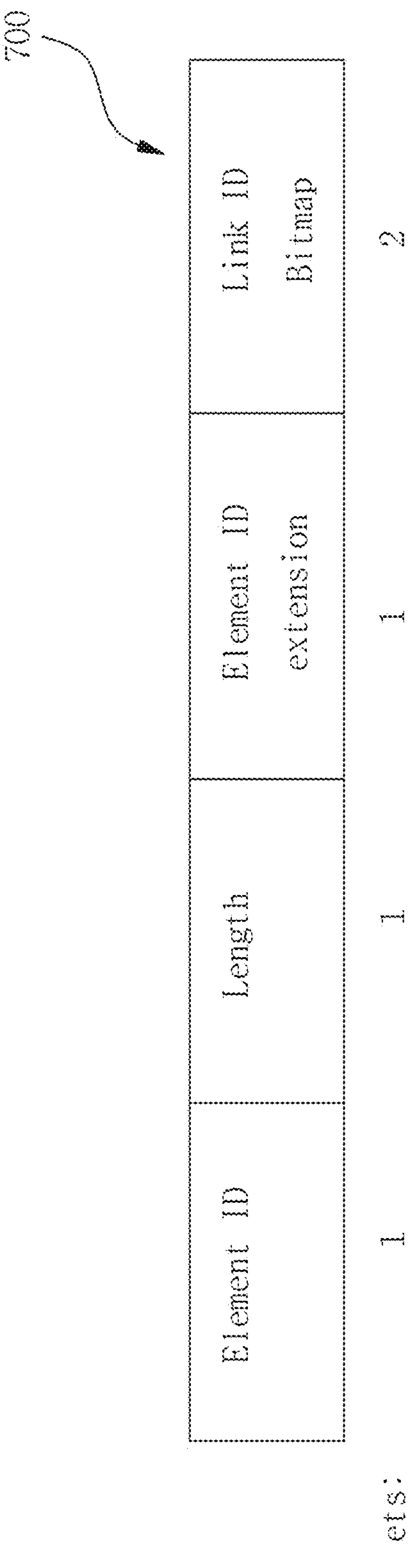
FIG. 7A shows an example of a new information element to indicate pending buffered traffic for a non-AP MLD in accordance with an embodiment.

FIG. 7A shows an example of a new information element 700 to indicate pending buffered traffic for a non-AP MLD in accordance with an embodiment. This example may be applicable to IEEE 802.11be standard and any of future amendments to IEEE 802.11 standard.

In FIG. 7A, the new information element 700 may include an Element ID field, a Length field, an Element ID extension field, and a Link ID Bitmap field. The Element ID field and the Element ID Extension field may include information to identify the new information element 700. The Length field may indicate a length of the new information element 700. The Link ID bitmap field may indicate a status of buffered traffic for all enabled links between an AP MLD and an associated non-AP MLDs. In this example, the Element ID field, the Length field, and the Element ID extension field have a length of 1 octet each, while the Link ID bitmap field has a length of 2 octets.

The Link ID bitmap field may include a bitmap in a similar way to the Per-link Traffic Indication field of the Multi-Link Traffic Indication element in FIGS. 5A and 5B. This enables the non-AP MLD to interpret the new information element and determine on which links the non-AP MLD needs to retrieve the buffered traffic from the AP MLD. In an embodiment, the order of the link IDs corresponding to the Link ID bitmap field may be similar to the order of indications in the Per-link Traffic Indication field of the Multi-Link Traffic Indication element. In an embodiment, the Link ID bitmap field may either 1 or 2 octets, depending on whether the number of per-link traffic indication bits associated with each AID included in the Multi-Link Traffic Indication element is less than or equal to 8 bits, or greater than 8 bits. Zero padding bits may be used if the number of bits is not a multiple of 8 bits. The STAs of the non-AP MLD, operating on the links where corresponding bits in the Link ID bitmap field are set to 1, may transition to awake state from doze state. They may transmit a PS-Poll frame or a U-ASPD trigger frame to the corresponding APs of the AP MLD to retrieve the buffered traffic. The new information element 700 may be included, by an AP of the AP MLD, in a downlink frame to a STA of the associated non-AP MLDs. In an embodiment, the new information element may be the Multi-Link Traffic Indication element as explained in FIG. 5A. The Multi-Link Traffic Indication element may indicate a status of buffered traffic for all enabled links between an AP MLD and an associated non-AP MLDs.

Figure 7B:
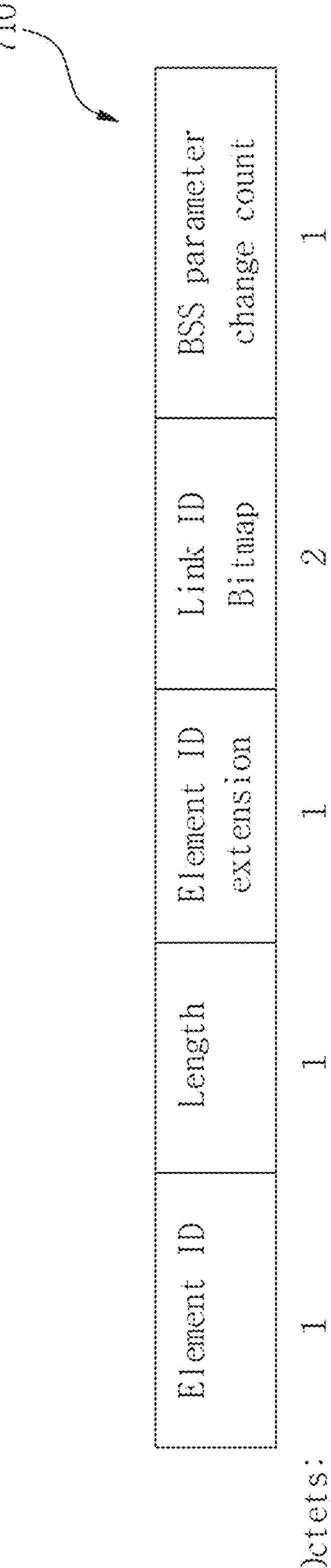
FIG. 7B shows another example of a new information element to indicate pending buffered traffic for a non-AP MLD in accordance with an embodiment.

FIG. 7B shows another example of a new information element 710 to indicate pending buffered traffic for a non-AP MLD in accordance with an embodiment. This example may be applicable to IEEE 802.11be standard and any of future amendments to IEEE 802.11 standard.

In some aspects, the various fields in the new information element 710 may be the same as or similar to corresponding fields in the new information element 700 shown in FIG. 7A, with examples of differences described below. For instance, the new information element 710 may include an additional field, a basic service set (BSS) parameter change count (BPCC) field (also may be referred to as a check beacon field) as shown in FIG. 7B. The BPCC field may indicate the need for an associated non-AP MLDs or STAs to check for the critical updates on multi-link setup or enabled links. In this example, the BPCC field may have a length of 1 octet. Upon receipt of the new information element, a STA of an associated non-AP MLD may attempt to decode the next beacon frame to check for critical updates or may transmit a multi-link probe request frame to fetch the updated BSS parameter.

Figure 8:
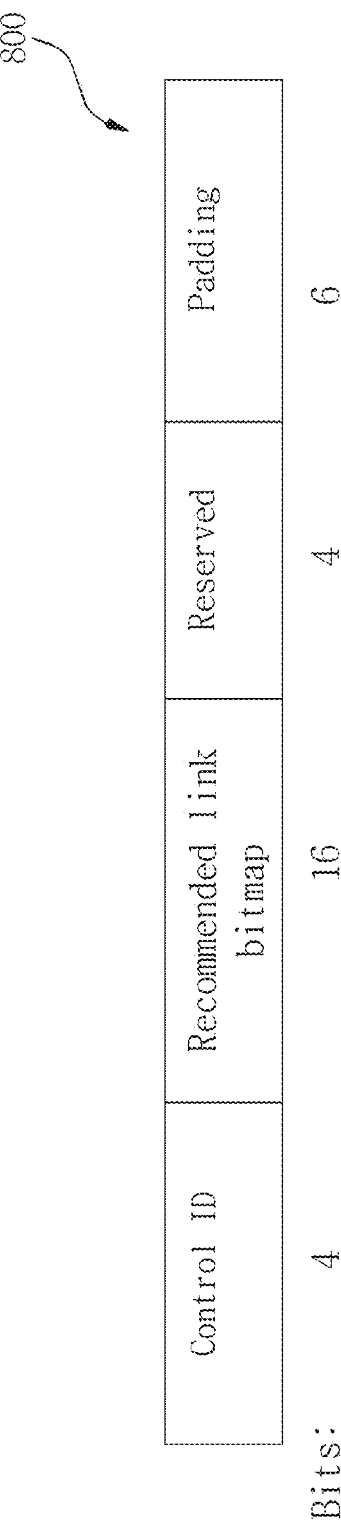
FIG. 8 shows another example of an A-Control subfield to indicate pending buffered traffic for a non-AP MLD in accordance with an embodiment.

FIG. 8 shows another example of an A-Control subfield 800 to indicate pending buffered traffic for a non-AP MLD in accordance with an embodiment. This example may be applicable to IEEE 802.11be standard and any of future amendments to IEEE 802.11 standard.

This example may be a new type of A(aggregated)-Control subfield in the HE (high-efficiency)-variant HT (higher throughput) control field, which may be referred to as a 'multi-link traffic indication (MLTI)-variant A-Control subfield' or simply a 'MLTI Control subfield' for brevity. In various embodiments, this control subfield may also be referred to as a 'Link Recommendation' control field, a 'Traffic Indication' control field, a 'Wake-up Request' control field, a 'Wake Request' control field, a 'Link Activation Request' control field, a 'Link Expansion Request' control field, a 'Link Utilization Request' control field, a 'Link Usage Request' control field, a 'Buffered TID' control field, and so on. Additionally, the MLTI Control subfield may be included in a QoS Data frame, a QoS Null frame, and individually addressed management frames transmitted by an AP MLD to a non-AP MLD. The MLTI Control subfield may indicate that the AP MLD has pending buffered traffic for other STAs of the non-AP MLD or recommend another link on which other STAs of the non-AP MLD may retrieve buffered traffic.

In FIG. 8, the MLTI Control subfield may include a Control ID subfield, a Recommended link bitmap subfield, a Reserved subfield, and Padding bits. The Control ID subfield may include information to identify the MLTI Control subfield 800. The Control ID subfield may have a length of 4 bits. The Recommended link bitmap subfield may indicate the link IDs of the STAs which are recommended to wake up and retrieve the buffered traffic. The Recommended link bitmap subfield may have a length of 16 bits. In some implementations, the Recommended link bitmap subfield may also be referred to as a 'Link Recommendation bitmap subfield' or a 'Traffic indication Link ID bitmap subfield', and so on.

In an embodiment, a bit in position i of the Recommended link bitmap subfield may be set to 1 when i) the AP MLD has buffered traffic with TID(s) that are mapped to the link i of the non-AP MLD associated with the AP MLD, and ii) the link i is not the same as the link on which the recipient STA of the non-AP MLD currently operates. Otherwise, the bit may be set to 1.

In an embodiment, a bit in position i of the Recommended link bitmap subfield may be set to 1 when a STA of a non-AP MLD operating on the link i is recommended to retrieve individually addressed traffic (i.e., BUs) from an AP MLD associated with the non-AP MLD. On the other hand, a bit in position i of the Recommended link bitmap subfield may be set to 0 when a STA of a non-AP MLD operating on link i is not recommended to retrieve individually addressed BUs from an AP MLD associated with the non-AP MLD. In other words, an AP of an AP MLD may set a bit in position i of the Recommended link bitmap subfield to 1 when i) the AP MLD has buffered traffic with TID(s) that are mapped to the link i of the non-AP MLD associated with the AP MLD and the link i is a recommended link to retrieve the buffered traffic, and ii) the link i is not the same as the link on which the recipient STA of the non-AP MLD currently operates. Otherwise, the bit may be set to 1.

In an embodiment, the link indication in the Recommended link bitmap subfield may be consistent with the link indication in the Multi-Link Traffic Indication element, as explained in reference to FIGS. 5A and 5B, except that there is a change due to new traffic arrival or delivery of some BUs. In some implementations, a link recommendation to the non-AP MLD provided in the MLTI Control subfield may replace any traffic indication and link recommendation provided in the TIM element and a Multi-Link Traffic Indication element previously transmitted by the AP MLD.

In an embodiment, an AP of an AP MLD may transmit a downlink frame including the MLTI Control subfield to a STA of a non-AP MLD associated with the AP MLD where all bits in the Recommended link bitmap subfield of the MLTI Control subfield are set to 0, indicating to the non-AP MLD that there is no remaining individually address BUs to the non-AP MLD. In an embodiment, the AP MLD may include the MLTI Control subfield only in QoS Null frames or QoS Data frames with a More data bit set to 0.

When a STA of a non-AP MLD supports the MLTI Control subfield and receives a QoS frame or a QoS Null frame containing the MLTI Control subfield from an AP of an AP MLD, other STAs of the non-AP MLD operating on the links indicated by the Recommended link bitmap subfield may issue a PS Poll frame or a U-APSD trigger frame to retrieve buffered BUs from the AP MLD.

The support for transmission and reception of the MLTI Control subfield may be optional or mandatory in the IEEE 802.11be standard and any of future amendments to IEEE 802.11 standard.

Figure 9A:
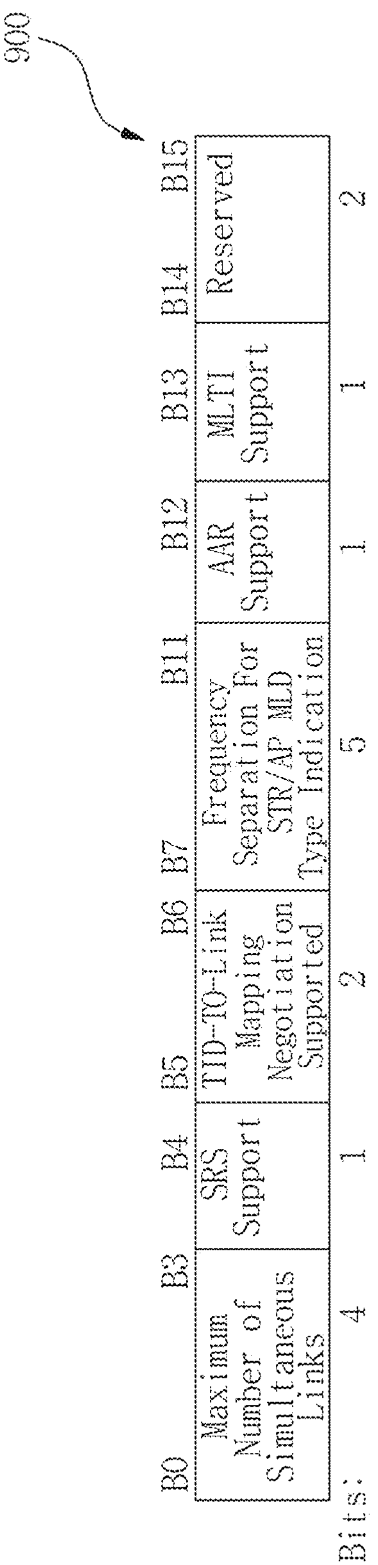

FIGS. 9A and 9B show an example of multi-link device (MLD) capabilities and operations subfield 900 of a basic multi-link element in accordance with an embodiment. This example may be applicable to IEEE 802.11be standard and any of future amendments to IEEE 802.11 standard.

In FIG. 9A, the MLD capabilities and operations subfield 900 may include a Maximum Number of Simultaneous Links subfield, an SRS (single response scheduling) Support subfield, a TID-To-Link Mapping Negotiation Support subfield, a Frequency Separation For STR (Simultaneous transmit and receive)/AP MLD Type Indication subfield, an AAR (AP assistance request) Support subfield, a MLTI Support subfield, and Reserved subfield.

The Maximum Number of Simultaneous Links subfield may indicate a maximum number of STAs affiliated with the MLD that support simultaneous transmission or reception of frames on the respective links. The SRS Support subfield may indicate support for the reception for a frame that carries an SRS Control subfield. The TID-To-Link Mapping Negotiation Support subfield may indicate for TID-to-link mapping negotiation. The Frequency Separation For STR/AP MLD Type Indication subfield may i) indicate a minimum frequency gap between any two links that is recommended by a non-AP MLD for STR operation and ii) indicate a type of an AP MLD. The AAR Support subfield may indicate that an AP MLD supports receiving a frame with AAR Control subfield. The MLTI Support subfield may indicate that a non-AP MLD supports receiving a frame with the MLTI Control subfield. As shown in FIG. 9B, this subfield may be reserved for an AP MLD. For a non-AP MLD, this subfield may be set to 1 if the non-AP MLD supports reception of frame with the MLTI Control subfield, and otherwise this subfield is set to 0.

In an embodiment, an AP MLD that is capable of providing multi-link traffic indications via the MLTI Control subfield may set the dot11MLTIOptionImplemented to true. An AP affiliated with an AP MLD with dot11MLTIOptionImplemented set to true, may further indicate this capability by setting a MLTI Support subfield to 1. Otherwise, the AP may set the MLTI Support subfield to 0.

In an embodiment, a non-AP MLD that supports receiving multi-link traffic indications via the MLTI Control subfield may set the dot11MLTIOptionImplemented to true. A STA affiliated with a non-AP MLD with dot11MLTIOptionImplemented that is equal to true, may further indicate this capability by setting the MLTI Support subfield to 1. Otherwise, the STA may set the MLTI Support subfield to 0.

In an embodiment, an AP may not transmit a frame containing the MLTI Control subfield with the bit set to 1 to identify its own link. An AP with dot11MLTIOptionImplimented that is set to false may not transmit the frame containing the MLTI Control subfield to associates STAs. A non-AP STA with dot11MLTIOptionImplemented that is set to false may ignore the MLTI Control subfield transmitted in a frame from the associated AP.

FIG. 10 shows another example of a MLTI Control subfield 1000 in accordance with an embodiment. This example may be applicable to IEEE 802.11be standard and any of future amendments to IEEE 802.11 standard.

In FIG. 10, the MLTI Control subfield 1000 may include a Control ID subfield, a Recommended link bitmap subfield, a MLTI/AAR subfield, a Reserved subfield, and Padding bits. The various fields in the MLTI Control subfield 1000 may be the same as or similar to the MLTI Control subfield 800 in FIG. 8, except for the MLTI/AAR subfield which has a length of one bit.

This example may be a generalization of the AAR Control subfield defined in IEEE 802.11be standard. Accordingly, the MLTI Control subfield 1000 may reuse the same Control ID subfield as AAR Control subfield defined in the IEEE 802.11be standard. Thus, the AAR Control subfield may also be referred to as MLTI Control subfield.

In an embodiment, the MLTI Control subfield 1000 may have the MLTI Control functionality when transmitted by an AP MLD. The MLTI Control subfield 1000 may be interpreted to have AAR Control functionality when transmitted by a non-AP MLD with EMLSR (enhanced multi-link single radio), NSTR (non-simultaneous transmit and receive) or EMLMR (enhanced multi-link multi-radio) constraints, and with the dot11AAROptionImplemented set to true. Otherwise, the MLTI Control subfield 1000 may be reserved for other purposes.

The MLTI/AAR subfield may indicate if the MLTI Control subfield 1000 has the MLTI Control functionality or AAR Control functionality. For instance, the MLTI/AAR subfield may be set to 1 to indicate the MLTI Control functionality. Otherwise it may set to 0 to indicate AAR Control functionality.

In an embodiment, the MLTI Control subfield 1000 may be transmitted by an AP of an AP MLD to a non-AP MLD when both the AP MLD and a non-AP MLD have dot11MLTIOptionImplemented set to true and the MLTI/AAR subfield is set to 1.

In an embodiment, the MLTI/AAR subfield may be generalized to a 'Subtype' field with a length of 2, 3, or 4 bits. It may be used for future extensions to other types of A-Control fields that may also utilize a recommended link bitmap, apart from AAR Control subfield and MLTI Control subfield. For example, one subtype may be used for indicating a buffered TID bitmap which will be discussed later and another sub-type may indicate recommended link bitmap.

There may be a general-purpose A-Control subfield that can be transmitted by a first MLD for cross-link indication to a second MLD, which may be referred to as a Link Indication A-Control subfield.

Figure 11A:
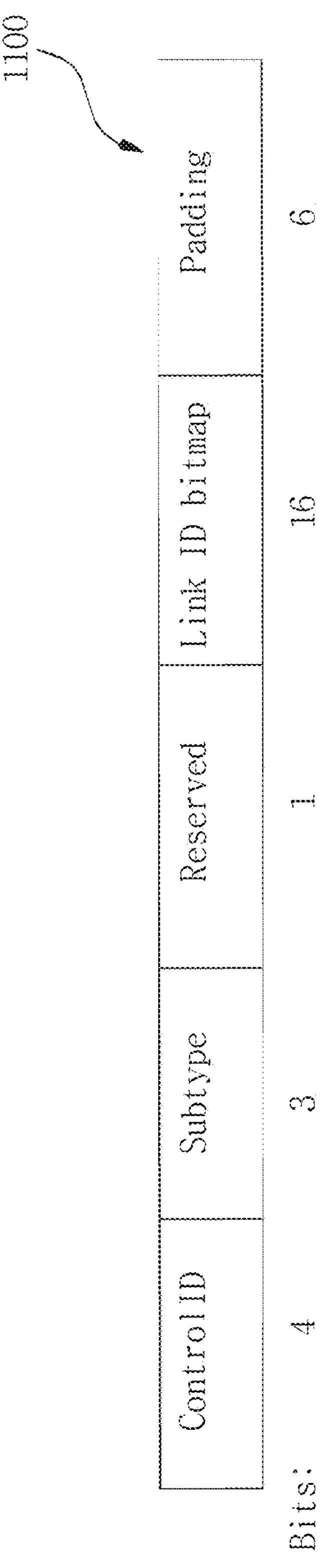
FIG. 11A shows an example of a Link Indication A-Control subfield in accordance with an embodiment.

FIG. 11A shows an example of a Link Indication A-Control subfield 1100 in accordance with an embodiment. This example may be applicable to IEEE 802.11be standard and any of future amendments to IEEE 802.11 standard.

In FIG. 11A, the Link Indication (LI) A-Control subfield 1100 may include a Control ID subfield, a Subtype subfield, a Reserved subfield, a Link ID bitmap subfield, and Padding bits. The Subtype subfield, the Reserved subfield, and the Link ID bitmap subfield may collectively form a Control Information subfield. The Control Information subfield may indicate a set of link IDs of STAs affiliated with transmitting or receiving MLD, and a purpose of the link ID indication as explained below. The Control Information subfield may be used by an MLD with which the transmitting STA is affiliated.

The Subtype subfield may indicate the purpose of the Link ID map subfield. In the example of FIG. 11B, when the Subtype subfield is set to 0, the LI A-Control subfield 1100 has AAR functionality and the Control information subfield indicates the link IDs of STAs that are requesting assistance from the corresponding APs for medium synchronization recovery. When the Subtype subfield is set to 1, the LI A-Control subfield 1100 has MLTI Control or WR (wake-up request) functionality and the Control Information subfield indicates the link IDs of STAs affiliated with the recipient non-AP MLDs that are requested to transition to awake state by the transmitting AP MLD. The Subtype values 2-7 are reserved for other purposes.

The Link ID bitmap subfield may indicate a set of link IDs of the STAs affiliated with transmitting or receiving non-AP MLDs. A value of 1 in a bit position i may indicate that link ID i is an indicated link and a value of 0 indicates that the link ID i is not an indicated link.

In an embodiment, when an AP MLD supports transmission of the LI A-Control subfield 1100 with WR Subtype or a non-AP MLD supports reception of the LI A-Control subfield 1100 with WR subtype, the MLTI Support subfield (or referred to as WR Support subfield) in the MLD capabilities and operations subfield in FIG. 9A is set to 1. Otherwise, the MLTI Support subfield is set to 0.

An AP of an AP MLD supporting WR may set a bit in position i of the Link ID bitmap subfield to 1. It may indicate that the AP MLD has buffered BUs with TIDs that are mapped to the link i for the non-AP MLD. The buffered BUs are recommended to be retrieved by a STA of the non-AP MLD operating on the link i. Otherwise, the bit is set to 0.

When STAs of a non-AP MLD supporting WR receive a frame from an AP with LI A-Control subfield 1100 of subtype WR, i) the STAs operating on the links indicated as 1 in the Link ID bitmap subfield, may issue a PS-Poll frame or a U-APSD trigger frame (when the STA uses U-APSD and all access categories (ACs) are delivery-enabled) to retrieve buffered BUs from the AP MLD, and ii) the STAs operating on the links indicated as 0 in the Link ID bitmap subfield, may not need to issue a PS-Poll frame or U-APSD trigger frame even if the links are recommended in a Multi-Link Traffic Indication element previously transmitted from the AP MLD. In some implementations, the LI A-Control subfield 1100 of subtype WR may not be transmitted by a non-AP MLD.

In an embodiment, the STAs operating on the links indicated as 1 in the Link ID bitmap subfield may also transition to active mode by setting the PM bit to 0 in a U-APSD trigger frame or a QoS Null frame that is transmitted to the AP MLD. In another embodiment, if the links indicated as 1 in the Link ID bitmap subfield are disabled (excluding cases where the links are disabled by an announced TID-to-link mapping), the non-AP MLD may renegotiate a new TID-to-link mapping which maps all TIDs to the links indicated as 1 in the Link ID bitmap subfield.

Figure 12:
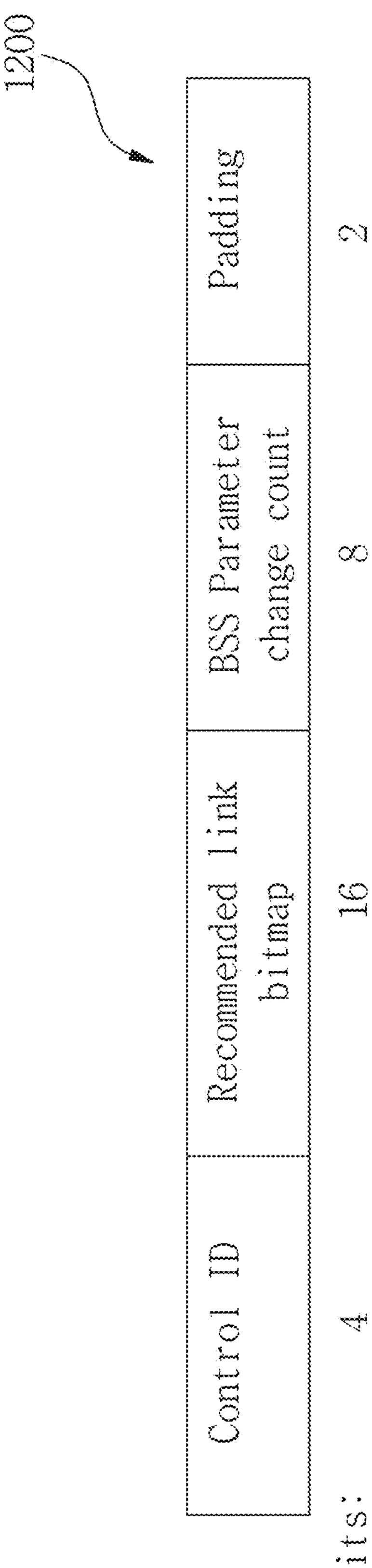
FIG. 12 shows another example of a MLTI Control subfield in accordance with an embodiment.

FIG. 12 shows another example of a MLTI Control subfield 1200 in accordance with an embodiment. This example may be applicable to IEEE 802.11be standard and any of future amendments to IEEE 802.11 standard.

In FIG. 12, the MLTI Control subfield 1200 may include a Control ID subfield, a Recommended link bitmap subfield, a BSS Parameter Change count subfield, and Padding bits. The various fields in the MLTI Control subfield 1200 may be the same as or similar to the MLTI Control subfield 800 in FIG. 8, except for the BSS Parameter change count (BPCC) subfield which has a length of 8 bits.

The BPCC subfield may indicate the BSS Parameter change count of the transmitting AP of the AP MLD. A non-AP MLD may determine if it needs to receive a next beacon frame on current link based on the BPCC subfield. In an embodiment, the non-AP MLD may detect that the value of the BPCC subfield in the MLTI Control subfield 1200 is different from the BPCC value for the link received in a preceding beacon frame, the non-AP MLD may attempt to receive the next beacon frame on the link.

Figure 13A:
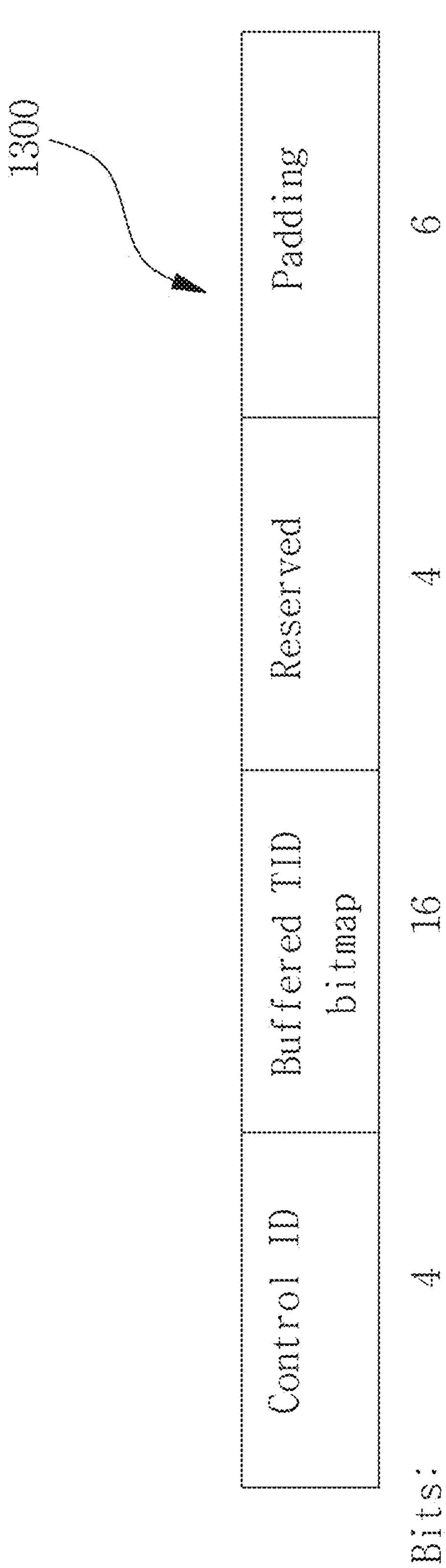
FIGS. 13A to 13C show other examples of a MLTI Control subfield in accordance with an embodiment.

FIG. 13A shows another example of a MLTI Control subfield 1300 in accordance with an embodiment. This example may be applicable to IEEE 802.11be standard and any of future amendments to IEEE 802.11 standard.

In FIG. 13A, the MLTI Control subfield 1300 may include a Control ID subfield, a Buffered TID bitmap subfield, a Reserved, and Padding bits. The various fields in the MLTI Control subfield 1300 may be the same as or similar to the MLTI Control subfield 800 in FIG. 8, with exception of the Buffered TID bitmap subfield instead of the Recommended link bitmap subfield. The Buffered TID bitmap subfield may indicate a buffer status indication for all TIDs corresponding to the non-AP MLD. In FIG. 13A, the Buffered TID bitmap subfield has a length of 16 bits where the i-th bit corresponds to TID i−1. When the i-th bit is set to 1, it indicates that the AP MLD has buffered BUs corresponding to the TID i−1 at the AP MLD. Otherwise, the bit is set to 0. In some implementations, the Buffered TID bitmap may have only 8 bits and indicate traffic for the first 8 TIDs out of 16 TIDs.

When a STA of a non-AP MLD supporting the MLTI indication receives a QoS Data frame or QoS Null frame with the MLTI Control subfield 300 from an AP of an AP MLD, the non-AP MLD may use information in the Buffered TID bitmap subfield and a TID-to-link mapping to determine which STAs to wake up and transmit a PS-Poll frame or a U-APSD trigger frame (when the STA uses U-APSD and all ACs are delivery-enabled) to retrieve buffered BUs from the AP MLD. For example, the non-AP MLD may ensure that for each TID indicates as 1 in the Buffered TID bitmap subfield, at least one STA, which has TIDs mapped to the STA, transitions to awake state and transmit a PS Poll frame or a U-APSD trigger frame.

In an embodiment, the AP MLD may skip or exclude all BUs that are scheduled to be delivered in the current frame exchange sequence or TXOP during the calculation of the Buffered TID bitmap subfield. In an embodiment, the construction of the Buffered TID bitmap subfield may be determined based on the current knowledge at the transmitting STA, at the point of construction of the MLTI Control subfield 1300, regarding the buffer status of all the TIDs.

Figure 13B:
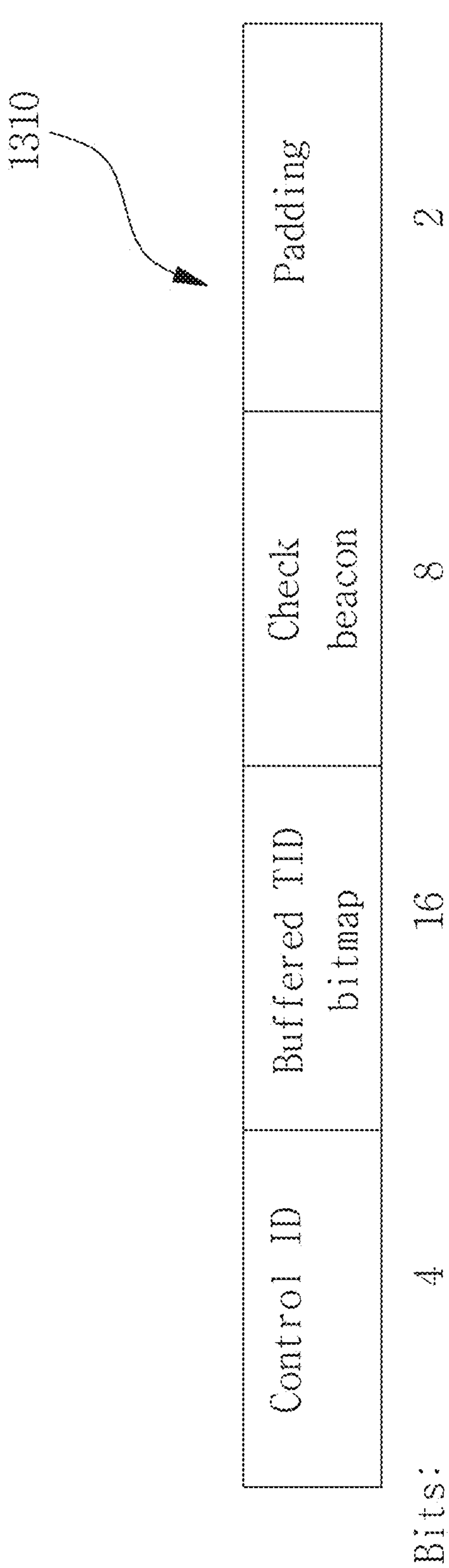

FIG. 13B shows another example of a MLTI Control subfield 1310 in accordance with an embodiment. This example may be applicable to IEEE 802.11be standard and any of future amendments to IEEE 802.11 standard.

In FIG. 13B, the MLTI Control subfield 1310 may include a Control ID subfield, a Buffered TID bitmap subfield, a Check beacon subfield, and Padding bits. The various fields in the MLTI Control subfield 1310 may be the same as or similar to the MLTI Control subfield 1300 in FIG. 13A, with exception of the Check beacon subfield instead of the Reserved subfield. The Check beacon subfield may be a BSS parameter change count field. The Check beacon subfield has a length of 8 bits and provides information that indicates if the receiving STA needs to receive the next beacon frame or send a multi-link probe request frame to retrieve updates on the BSS Parameter.

Figure 13C:
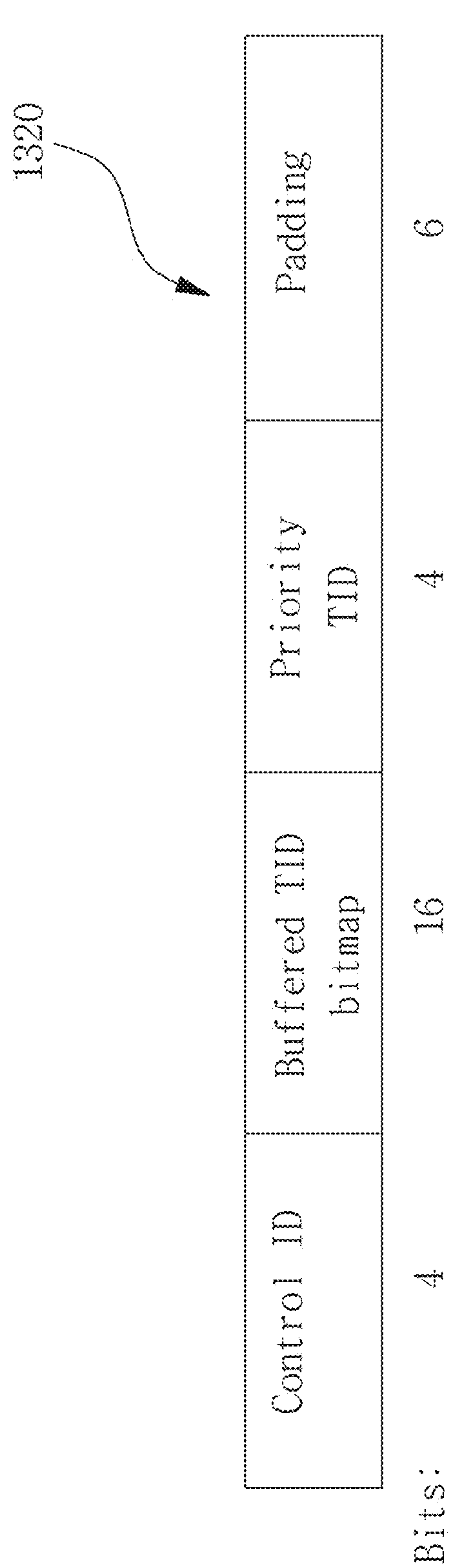

FIG. 13C shows another example of a MLTI Control subfield 1320 in accordance with an embodiment. This example may be applicable to IEEE 802.11be standard and any of future amendments to IEEE 802.11 standard.

In FIG. 13C, the MLTI Control subfield 1320 may include a Control ID subfield, a Buffered TID bitmap subfield, a Priority TID subfield, and Padding bits. The various fields in the MLTI Control subfield 1320 may be the same as or similar to the MLTI Control subfield 1300 in FIG. 13A, with exception of the Priority TID subfield instead of the Reserved subfield. The Priority TID subfield has a length of 4 bits and indicates the TIDs that have the most amount of buffered traffic or the TIDs that have to be prioritized to be retrieved (e.g., latency sensitive traffic).

In an embodiment, the receiving non-AP MLD may additionally consider the priority TID subfield when determining which STAs to wake up and transmit a PS-Poll frame or a U-APSD trigger frame to the AP MLD. In some implementations, the priority TID subfield may not indicate a TID for which a corresponding bit in the Buffered TID bitmap subfield is set to 0. In some implementations, the priority TID subfield may indicate a TID for which a corresponding bit in the Buffered TID bitmap subfield is set to 0, indicating that none of the TIDs indicated in the Buffered TID bitmap subfield are prioritized.

In FIG. 13C, the Padding has a length of 6 bits. However, in an embodiment, the Padding may have a length of 5 bits and the non-padding bit (1 bit) may indicate that the presence of the Priority TID subfield. When the Priority TID subfield is absent, it implies that none of TIDs are prioritized.

Figure 14:
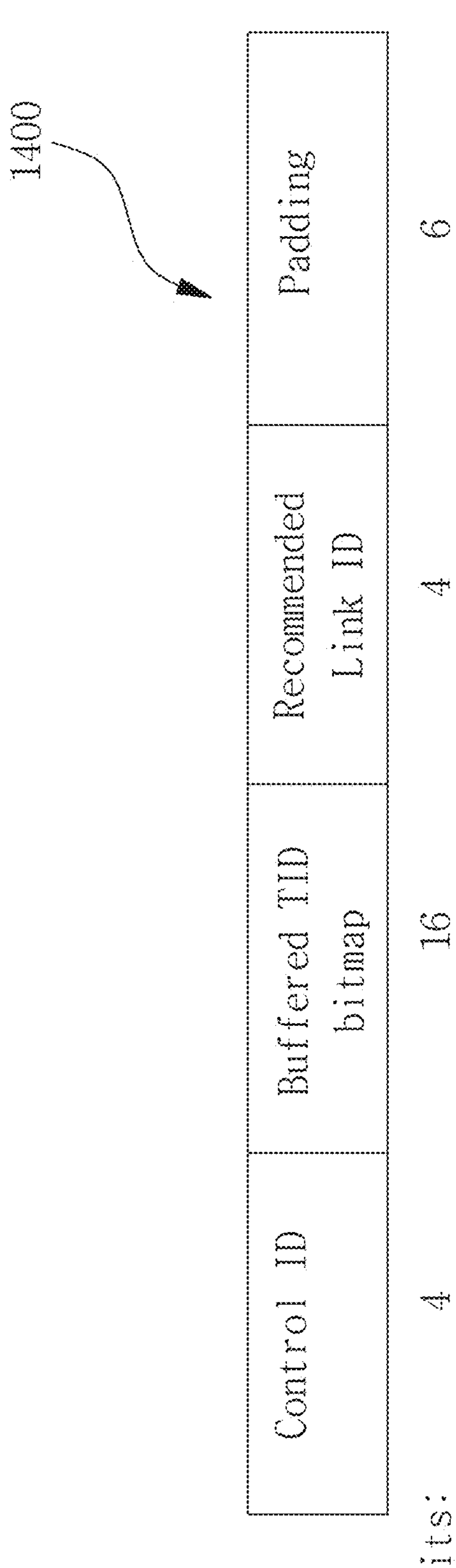
FIG. 14 shows another example of a MLTI Control subfield in accordance with an embodiment.

FIG. 14 shows another example of a MLTI Control subfield 1400 in accordance with an embodiment. This example may be applicable to IEEE 802.11be standard and any of future amendments to IEEE 802.11 standard.

In FIG. 14, the MLTI Control subfield 1400 may include a Control ID subfield, a Buffered TID bitmap subfield, a Recommended Link ID subfield, and Padding bits. The various fields in the MLTI Control subfield 1400 may be the same as or similar to the MLTI Control subfield 1300 in FIG. 13A, with exception of the Recommended Link ID subfield instead of the Reserved subfield.

In this example, the MLTI Control subfield 1400 may include both the Buffered TID bitmap subfield and the Recommended Link ID subfield. When the i-th bit of the Buffered TID bitmap subfield is set to 1, it may indicate that the receiving non-AP MLD has at least one buffered BU which belongs to the corresponding TID (e.g., TID i−1). Otherwise, the bit is set to 0. In an embodiment, the calculation of the Buffered TID bitmap subfield may skip or exclude the BUs that are scheduled to be delivered in the current TXOP or on the current link where the TXOP is active.

The Recommended link ID subfield may indicate the link IDs where the AP recommends the non-AP MLD to retrieve at least a part of the buffered BUs. In an embodiment, the AP may always include a Recommended Link ID subfield. For instance, the AP may set the link ID of the current link to the Recommended Link ID subfield when the AP does not recommend any link to fetch the buffered BUs. In another embodiment, the MLTI Control subfield 1400 may include an additional 1-bit subfield, which may be referred to as a Recommend link ID present subfield, indicating the presence of the Recommended Link ID subfield. As a result, the Padding bits in the MLTI Control subfield 1400 may be reduced from 6 bits to 5 bits.

In an embodiment, a STA of the receiving non-AP MLD operating on the link indicated in the Recommended link ID subfield may transition to awake state or active state and transmit a PS-Poll frame or a U-APSD trigger frame to retrieve a buffered BUs. In an embodiment, the STA of the receiving non-AP MLD operating on the link indicated the Recommended link ID subfield may retrieve the buffered BUs corresponding to all TIDs by transmitting the PS-Poll frame or the U-APSD trigger frame, while other STAs may retrieve only buffered BUs corresponding to TIDs that are mapped to the link. Accordingly, a non-AP MLD may determine to transition all affiliated STAs to awake state or active state and jointly retrieve the buffered BUs, or to transition the STA operating on the recommended link and retrieve all buffered BUs via the recommended link.

In another embodiment, the Buffer Status Report (BSR) may be used to indicate that the AP MLD has pending buffered BUs for other STAs of the non-AP MLD or recommend another link on which other STAs of the non-AP MLD may retrieve buffered traffic. The BSR may be allowed to be transmitted by an AP of the AP MLD to a STA of the associated non-AP MLD in a QoS Control subfield or a BSR A-control subfield of a downlink frame. When the buffered BUs start to increase, an AP of the non-AP MLD may include the BSR in the QoS Control subfield or the BSR A-control subfield in a downlink frame, which is transmitted to a STA of the associated non-AP MLD in awake state. The information in the BSR may correspond to the BUs that are addressed to the non-AP MLD. The non-AP MLD may determine if it needs to transition other STAs affiliated with the non-AP MLD to awake state or active mode.

In an embodiment, there may be a newly defined EHT action frame, which may be referred to as a Buffer Status Report Request (BSRR) frame. The STA of the non-AP MLD may transmit the BSRR frame to an AP of the associated non-AP MLD to request transmission of the BSR from the AP. In response to receiving the BSRR frame or at a later time, the AP may transmit the BSR to the STA of the non-AP MLD.

A bit in the MLD capabilities and operations subfield in the basic multi-link element transmitted from the AP MLD may indicate whether the AP MLD supports transmission of BSR to associated non-AP MLDs.

Figure 15:
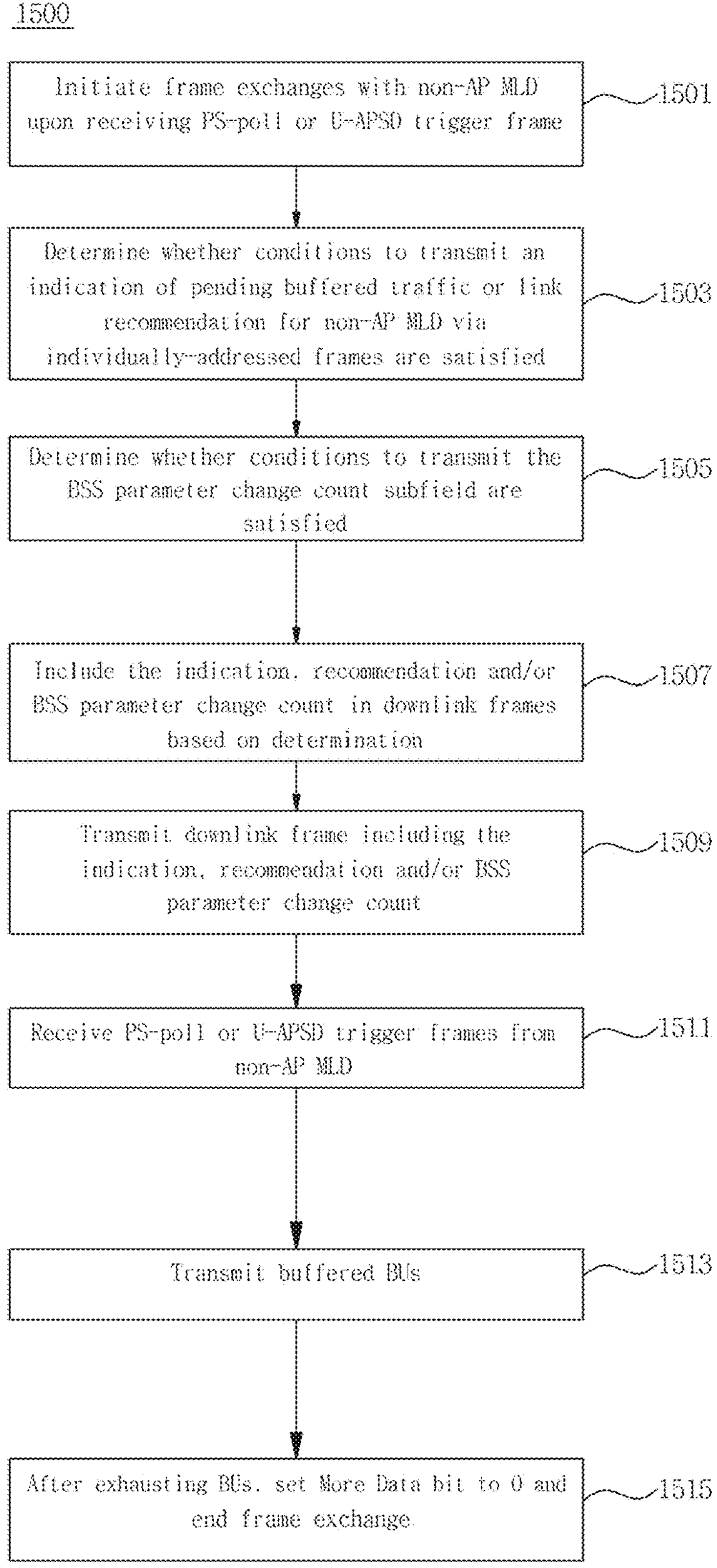
FIG. 15 shows an example of a process for indicating buffered traffic in individually addressed frames by an AP MLD in accordance with an embodiment.

FIG. 15 shows an example of a process 1500 for indicating buffered traffic in individually addressed frames by an AP MLD in accordance with an embodiment.

In operation 1501, an AP of an AP MLD may initiate frame exchanges with an STA of a non-AP MLD associated with the AP MLD in response to receiving a PS-Poll frame or a U-APSD trigger frame from the STA of the non-AP MLD.

In operation 1503, the AP of the AP MLD may determine whether conditions for transmitting an indication of pending buffered traffic or a link recommendation for the non-AP MLD via an individually addressed frame is satisfied. For example, the AP of the AP MLD may determine i) whether there is pending buffered traffic for the non-AP MLD on another link or ii) whether the AP MLD intends to recommend the non-AP MLD to use another link to retrieve the buffered traffic. Then, the process 1500 proceeds to operation 1505.

In operation 1505, the AP of the AP MLD may determine whether conditions for transmitting a BSS parameter change count are satisfied. For example, the AP of the AP MLD may determine whether there is critical updates to the BSS of the AP MLD on another link. Then, the process 1500 proceeds to operation 1507.

In operation 1507, the AP of the AP MLD may include the indication of pending buffered traffic, link recommendation and/or the BSS parameter change count in a downlink frame, based on the determinations in operations 1503 and 1505. Then, the process proceeds to operation 1509.

In operation 1509, the AP of the AP MLD may transmit the downlink frame including the indication of pending buffered traffic, link recommendation and/or the BSS parameter change count to the non-AP MLD.

In operation 1511, the AP MLD may receive a PS-Poll frame or a U-APSD trigger frame from another STA of the non-AP MLD. The PS-poll frame or the U-APSD trigger frame may be received via another link corresponding to the link indicated by the indication of the buffered traffic or recommended by the link recommendation included in the downlink frame. Then, the process proceeds to operation 1513.

In operation 1513, the AP MLD may transmit buffered BUs in response to the PS-Poll frame or the U-APSD trigger frame. The buffered BUs may be transmitted via the another link in the operation 1511. Therefore, another AP of the AP MLD, rather than the AP in operation 1509, may transmit the buffered BUs to the another STA of the non-AP MLD.

In operation 1515, the AP of the AP MLD may transmit a downlink frame with set More data bit to 0 and end frame exchanges when all buffered BUs are transmitted and exhausted.

FIG. 16 shows an example of a process 1600 for receiving indication of buffered traffic in individually addressed frames by a non-AP MLD in accordance with an embodiment.

In operation 1601, a STA of a non-AP MLD may transition from doze state to awake state and may transmit a PS-Poll frame or a U-APSD trigger frame to retrieve buffered traffic when the STA receives an indication of pending buffered traffic from a TIM element in a beacon frame. Then, the STA of the non-AP MLD may initiate frame exchanges with the AP of the AP MLD. Then, the process proceeds to operation 1603.

In operation 1603, when the non-AP MLD receives an indication of pending buffered traffic or link recommendation for other STAs affiliated with the non-AP MLD, the indicated or recommended STA may wake up and may transmit, to the corresponding AP of the AP MLD, a PS-poll and a U-APSD trigger frame to retrieve buffered traffic.

In operation 1605, when the non-AP MLD may receive a check beacon or BPCC with a different value from the one previously received for the current link, the STA of the non-AP MLD attempts to receive the next beacon frame on the current link.

In operation 1607, when the non-AP MLD may receive a QoS Null frame or a downlink frame with More data set to 0, the receiving STA may transition to doze state.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An access point (AP) multi-link device (MLD) associated with a wireless network, the AP MLD comprising:

a first AP and one or more second APs affiliated with the AP MLD; and a processor coupled to the first AP and the one or more second APs, the processor configured to:

perform individually addressed frame exchanges between a first station (STA) affiliated with a non-AP MLD and the first AP affiliated via a first link, transmit, to the first STA affiliated with the non-AP MLD via the first link, an individually addressed downlink frame including an indication of a presence of buffered traffic to the non-AP MLD on one or more second links or a link recommendation for the one or more second links to retrieve the buffered traffic, wherein each of the one or more second links is set up between one of the one or more second APs and a corresponding second STA affiliated with the non-AP MLD, wherein the individually addressed downlink frame further includes information indicating an absence of buffered traffic to the non-AP MLD on a third link or information indicating a third STA recommended to not transition to an awake state, receive, from a second STA affiliated with the non-AP MLD via a second link, a frame to request transmission of the buffered traffic via the second link, and transmit, to the second STA affiliated with the non-AP MLD via the second link, the buffered traffic in response to the frame.

2. The AP MLD of claim 1, wherein a traffic identifier (TID) of the buffered traffic is not mapped to the first link and the TID of the buffered traffic is mapped to the one or more second links.

3. The AP MLD of claim 1, wherein the one or more second STAs affiliated with the non-AP MLD are in doze state when the individually addressed downlink frame is transmitted.

4. The AP MLD of claim 1, wherein the indication of the presence of the buffered traffic or the link recommendation for the one or more second links is included in a control field of a media access control (MAC) header of the individually addressed downlink frame.

5. The AP MLD of claim 4, wherein the control field includes a bitmap to identify the one or more second STAs, and a field to identify a purpose of the bitmap.

6. The AP MLD of claim 1, wherein the indication of the presence of the buffered traffic or the link recommendation for the one or more second links is included in a buffer status report within a control field of the individually addressed downlink frame.

7. The AP MLD of claim 6, wherein the processor is further configured to receive, from the first STA affiliated with the non-AP MLD via the first link, a request to transmit the individually addressed downlink frame including the buffer status report.

8. The AP MLD of claim 1, wherein:

the individually addressed downlink frame further includes information about an update about a basic service set (BSS) to which the AP MLD belongs, and the information about the update indicates a need for the non-AP MLD to check for the update for at least one link between the AP MLD and the non-AP MLD.

9. The AP MLD of claim 1, wherein the AP MLD receives, from the non-AP MLD, an indication of support for receiving the indication of the presence of the buffered traffic or the link recommendation in individually addressed frames, before transmission of the individually addressed downlink frame.

10. A non-access point (AP) multi-link device (MLD) associated with a wireless network, the non-AP MLD comprising:

a first STA and one or more second STAs affiliated with the non-AP MLD; and a processor coupled to the first STA and the one or more second STAs, the processor configured to:

perform individually addressed frame exchanges between a first AP affiliated with an AP MLD and the first STA via a first link, receive, from the first AP affiliated with the AP MLD via the first link, a individually addressed downlink frame including an indication of a presence of buffered traffic to the non-AP MLD on one or more second links or a link recommendation for the one or more second links to retrieve the buffered traffic, wherein each of the one or more second links is set up between one of the one or more second STAs a corresponding second AP affiliated with the AP MLD, wherein the individually addressed downlink frame further includes information indicating an absence of buffered traffic to the non-AP MLD on a third link or information indicating a third STA recommended to not transition to an awake state, transmit, to a second AP affiliated with the AP MLD via a second STA on a second link, a frame to request transmission of the buffered traffic via the second link, and receive, from the second AP affiliated with the AP MLD via the second link, the buffered traffic.

11. The non-AP MLD of claim 10, wherein a traffic identifier (TID) of the buffered traffic is not mapped to the first link and the TID of the buffered traffic is mapped to the one or more second links.

12. The non-AP MLD of claim 10, wherein:

the one or more second STAs affiliated with the non-AP MLD are in doze state when the individually addressed downlink frame is transmitted, and the processor is further configured to coordinate that the second STA wakes up and transitions from the doze state to awake state or active state in response to receiving the individually addressed downlink frame.

13. The non-AP MLD of claim 10, wherein the indication of the presence of the buffered traffic or the link recommendation for the one or more second links is included in a control field of a media access control (MAC) header of the individually addressed downlink frame.

14. The non-AP MLD of claim 13, wherein the control field includes a bitmap to identify the one or more second STAs, and a field to identify a purpose of the bitmap.

15. The non-AP MLD of claim 10, wherein the indication of the presence of the buffered traffic or the link recommendation for the one or more second links is included in a buffer status report within a control field of the individually addressed downlink frame.

16. The non-AP MLD of claim 15, wherein the processor is further configured to transmit, to the first AP affiliated with the AP MLD via the first link, a request to transmit the individually addressed downlink frame including the buffer status report.

17. The non-AP MLD of claim 10, wherein:

the individually addressed downlink frame further includes information about an update about a basic service set (BSS) to which the AP MLD belongs, and the information about the update indicates a need for the non-AP MLD to check for the update for at least one link between the AP MLD and the non-AP MLD.

18. The non-AP MLD of claim 10, wherein the non-AP MLD transmits an indication of support for receiving the indication of the presence of the buffered traffic or the link recommendation in individually addressed frames, before reception of the individually addressed downlink frame.

* * * * *